US012106646B2

(12) United States Patent
Werner et al.

(10) Patent No.: US 12,106,646 B2
(45) Date of Patent: Oct. 1, 2024

(54) SECURITY / AUTOMATION SYSTEM CONTROL PANEL WITH ACTIVE MICROPHONES

(71) Applicant: Tyco Fire & Security GmbH, Neuhausen am Rheinfall (CH)

(72) Inventors: Ross Werner, San Francisco, CA (US); David Pulling, San Jose, CA (US); Anand Sastry, Los Altos Hills, CA (US); David Laone, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 17/458,775

(22) Filed: Aug. 27, 2021

(65) Prior Publication Data
US 2022/0270472 A1    Aug. 25, 2022

Related U.S. Application Data

(60) Provisional application No. 63/151,363, filed on Feb. 19, 2021.

(51) Int. Cl.
*G08B 3/10* (2006.01)
*G01D 5/24* (2006.01)
(Continued)

(52) U.S. Cl.
CPC ......... *G08B 13/19682* (2013.01); *G01D 5/24* (2013.01); *G01D 18/00* (2013.01);
(Continued)

(58) Field of Classification Search
CPC ........ G08B 29/10; G08B 3/10; G08B 17/117; G08B 19/00; G08B 25/00; G08B 13/19682; G08B 25/10; H04R 29/00
See application file for complete search history.

(56) References Cited

U.S. PATENT DOCUMENTS 7,015,807 B2 *  3/2006  Roby ................ G08B 17/10
                                                340/531
9,030,562 B2    5/2015  Petricoin, Jr.
(Continued)

FOREIGN PATENT DOCUMENTS

CN         1469099 A     1/2004
CN       108711248 A    10/2018
(Continued)

OTHER PUBLICATIONS

Extended European Search Report in 22156553.4, dated Jul. 4, 2022, 9 pages.
(Continued)

*Primary Examiner* — John A Tweel, Jr.
(74) *Attorney, Agent, or Firm* — ARENTFOX SCHIFF LLP

(57) ABSTRACT

Example implementations include a method, apparatus, and computer-readable medium comprising monitoring, by a control panel, an ambient noise via one or more microphones in the control panel. The implementations further include determining, by the control panel, whether the ambient noise is indicative of a security event. In some non-limiting implementations, the control panel may be configured to detect events based on various noise detection models, such as continued noise level above a threshold, noise associated with multiple short sharp impacts (e.g., an intruder trying to kick down a door), gunshot detection, voice recognition to identify a request for assistance (e.g., a person asking for help), glass break detection, or detection of a particular standardized pattern of beeps such as the temporal-three pattern of a smoke detector going off (according to ISO 8201 and ANSI/ASA S3.41 Temporal Pattern), the temporal-four pattern of a carbon monoxide detector going off, etc.

19 Claims, 7 Drawing Sheets

(51) Int. Cl.

| | | |
|---|---|---|
| *G01D 18/00* | (2006.01) | |
| *G05B 19/042* | (2006.01) | |
| *G06F 3/0487* | (2013.01) | |
| *G06F 3/16* | (2006.01) | |
| *G06F 21/62* | (2013.01) | |
| *G08B 13/196* | (2006.01) | |
| *G08B 17/117* | (2006.01) | |
| *G08B 19/00* | (2006.01) | |
| *G08B 25/10* | (2006.01) | |
| *G08B 29/10* | (2006.01) | |
| *H04B 17/318* | (2015.01) | |
| *H04B 17/364* | (2015.01) | |
| *H04B 17/382* | (2015.01) | |
| *H04B 17/391* | (2015.01) | |
| *H04M 1/64* | (2006.01) | |
| *H04N 7/18* | (2006.01) | |
| *H04N 23/57* | (2023.01) | |
| *H04R 29/00* | (2006.01) | |
| *H04W 72/30* | (2023.01) | |
| *H04W 84/02* | (2009.01) | |
| *H04W 84/18* | (2009.01) | |
| *G06V 40/16* | (2022.01) | |

(52) U.S. Cl.
CPC ......... *G05B 19/042* (2013.01); *G06F 3/0487* (2013.01); *G06F 3/16* (2013.01); *G06F 21/629* (2013.01); *G08B 3/10* (2013.01); *G08B 17/117* (2013.01); *G08B 19/00* (2013.01); *G08B 25/10* (2013.01); *G08B 29/10* (2013.01); *H04B 17/318* (2015.01); *H04B 17/364* (2015.01); *H04B 17/382* (2015.01); *H04B 17/391* (2015.01); *H04M 1/64* (2013.01); *H04N 7/183* (2013.01); *H04N 7/188* (2013.01); *H04N 23/57* (2023.01); *H04R 29/00* (2013.01); *H04W 72/30* (2023.01); *H04W 84/02* (2013.01); *H04W 84/18* (2013.01); *G05B 2219/25257* (2013.01); *G06V 40/172* (2022.01)

(56) References Cited

U.S. PATENT DOCUMENTS

| | | | |
|---|---|---|---|
| 9,124,783 B2 * | 9/2015 | Maslan | H04N 7/188 |
| 9,484,768 B2 | 11/2016 | Park et al. | |
| 9,497,202 B1 | 11/2016 | Calo et al. | |
| 9,997,054 B2 | 6/2018 | Sweeney et al. | |
| 10,296,040 B2 | 5/2019 | Park et al. | |
| 10,663,321 B1 | 5/2020 | Martin et al. | |
| 10,832,665 B2 | 11/2020 | Barnett, Jr. | |
| 10,861,265 B1 | 12/2020 | Merkley et al. | |
| 10,978,050 B2 * | 4/2021 | Khadloya | G06F 3/167 |
| 11,200,786 B1 | 12/2021 | Madden | |
| 2004/0260427 A1 | 12/2004 | Wimsatt | |
| 2006/0104312 A1 | 5/2006 | Friar | |
| 2006/0107298 A1 | 5/2006 | Friar | |
| 2006/0177071 A1 | 8/2006 | Eskildsen | |
| 2006/0250260 A1 | 11/2006 | Albert et al. | |
| 2007/0024443 A1 | 2/2007 | Babich et al. | |
| 2007/0223745 A1 | 9/2007 | Feng et al. | |
| 2007/0262858 A1 | 11/2007 | Smith | |
| 2009/0135010 A1 | 5/2009 | Fosty et al. | |
| 2013/0187664 A1 | 7/2013 | Deumal et al. | |
| 2013/0278410 A1 | 10/2013 | Smith et al. | |
| 2014/0062466 A1 | 3/2014 | Thibault et al. | |
| 2014/0066046 A1 | 3/2014 | Keshavdas et al. | |
| 2014/0076072 A1 | 3/2014 | Gore et al. | |
| 2014/0267716 A1 | 9/2014 | Child et al. | |
| 2014/0302795 A1 | 10/2014 | Chacon et al. | |
| 2015/0156031 A1 | 6/2015 | Fadell et al. | |
| 2015/0188725 A1 | 7/2015 | Coles | |
| 2015/0235539 A1 | 8/2015 | Orvis et al. | |
| 2015/0356859 A1 | 12/2015 | Hwang et al. | |
| 2016/0018799 A1 | 1/2016 | Gettings et al. | |
| 2016/0173568 A1 | 6/2016 | Penilla et al. | |
| 2016/0335865 A1 * | 11/2016 | Sayavong | G08B 13/2491 |
| 2017/0026763 A1 * | 1/2017 | Pratt | H04N 7/183 |
| 2017/0032660 A1 * | 2/2017 | El-Mankabady | G10L 13/00 |
| 2017/0084143 A1 | 3/2017 | Acera et al. | |
| 2017/0109983 A1 | 4/2017 | Flint et al. | |
| 2017/0195130 A1 | 7/2017 | Landow et al. | |
| 2017/0213447 A1 | 7/2017 | Horrocks et al. | |
| 2017/0309142 A1 | 10/2017 | Phillips | |
| 2017/0315675 A1 * | 11/2017 | Lewis | H04N 21/44218 |
| 2017/0345420 A1 | 11/2017 | Barnett, Jr. | |
| 2018/0067593 A1 | 3/2018 | Tiwari et al. | |
| 2018/0101149 A1 * | 4/2018 | Moss | H04W 4/70 |
| 2018/0144615 A1 | 5/2018 | Kinney et al. | |
| 2018/0204431 A1 | 7/2018 | Meyer | |
| 2018/0261060 A1 | 9/2018 | Siminoff et al. | |
| 2018/0267701 A1 | 9/2018 | Rigg et al. | |
| 2018/0351789 A1 | 12/2018 | Ohmae et al. | |
| 2019/0114060 A1 | 4/2019 | Resudek | |
| 2019/0259259 A1 * | 8/2019 | Mullins | G08B 13/19682 |
| 2019/0272691 A1 | 9/2019 | Nye | |
| 2019/0352930 A1 | 11/2019 | Beck | |
| 2020/0026977 A1 * | 1/2020 | Lee | G06K 9/00536 |
| 2020/0193534 A1 | 6/2020 | Vick et al. | |
| 2020/0280446 A1 | 9/2020 | Matsumoto | |
| 2020/0402378 A1 | 12/2020 | Connell, II et al. | |
| 2021/0027597 A1 | 1/2021 | Nagel | |
| 2021/0029298 A1 | 1/2021 | Mysore et al. | |
| 2021/0049879 A1 | 2/2021 | Connell, II et al. | |
| 2021/0094582 A1 * | 4/2021 | Lee | G11B 27/031 |
| 2021/0150637 A1 | 5/2021 | Jia et al. | |
| 2021/0160675 A1 | 5/2021 | Perry | |
| 2021/0329165 A1 | 10/2021 | Liu et al. | |
| 2021/0334521 A1 | 10/2021 | Padmanabhan et al. | |
| 2022/0028249 A1 | 1/2022 | Saldin et al. | |
| 2022/0207972 A1 | 6/2022 | Madden et al. | |
| 2022/0222688 A1 | 7/2022 | Wang et al. | |
| 2022/0269388 A1 * | 8/2022 | Sastry | H04B 17/318 |
| 2022/0269768 A1 * | 8/2022 | Werner | G08B 25/14 |
| 2022/0303395 A1 | 9/2022 | Kerzner | |

FOREIGN PATENT DOCUMENTS

| | | |
|---|---|---|
| CN | 105812990 B | 6/2020 |
| CN | 212302696 U | 1/2021 |
| EP | 3270361 | 6/2019 |
| WO | 2020096969 A1 | 5/2020 |
| WO | 2020142179 A1 | 7/2020 |

OTHER PUBLICATIONS

Extended European Search Report in 22156554.2, dated Jul. 15, 2022, 8 pages.

Extended European Search Report in 22156555.9, dated Jul. 19, 2022, 8 pages.

Extended European Search Report in 22156556.7, dated Jul. 19, 2022, 10 pages.

* cited by examiner

SECURITY / AUTOMATION SYSTEM CONTROL PANEL WITH ACTIVE MICROPHONES

CROSS REFERENCE TO RELATED APPLICATION(S)

This application claims the benefit of U.S. Provisional Application Ser. No. 63/151,363, entitled "CLOUD SECURITY/AUTOMATION SYSTEM" and filed on Feb. 19, 2021, which is expressly incorporated by reference herein in its entirety.

FIELD

The present disclosure relates generally to security/automation systems and methods.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method comprising monitoring, by a control panel, an ambient noise via one or more microphones in the control panel. The method further includes determining, by the control panel, whether the ambient noise is indicative of a security event.

Another example implementation includes an apparatus comprising a memory and a processor communicatively coupled with the memory. The processor is configured to monitor, by a control panel, an ambient noise via one or more microphones in the control panel. The processor is further configured to determine, by the control panel, whether the ambient noise is indicative of a security event.

Another example implementation includes an apparatus comprising means for monitoring, by a control panel, an ambient noise via one or more microphones in the control panel. The apparatus further includes means for determining, by the control panel, whether the ambient noise is indicative of a security event.

Another example implementation includes a computer-readable medium storing instructions executable by a processor that, when executed, cause the processor to monitor, by a control panel, an ambient noise via one or more microphones in the control panel. The instructions are further executable by the processor to cause the processor to determine, by the control panel, whether the ambient noise is indicative of a security event.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
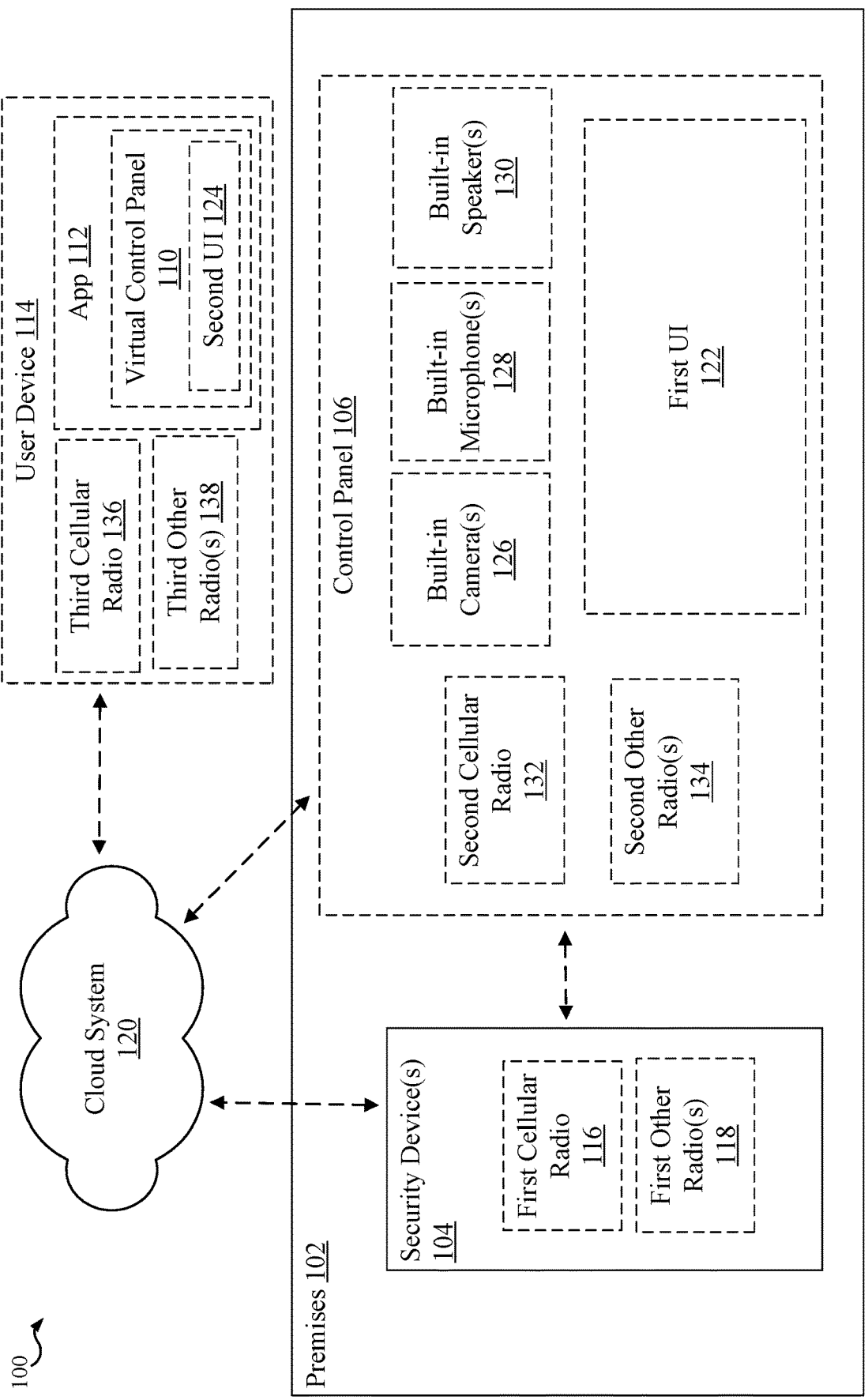
FIG. 1 is a schematic diagram of an example security/automation system, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Deconstructed Security/Automation System

Some security/automation systems provide an "All-in-One" control panel that includes hardware features, computing resources, software resources for implementing application intelligence, a user interface (UI), one or more radios, and external communication (e.g., with a monitoring station, a cloud system, etc.). For example, a control panel may include a user interface (e.g., processor and software resources), one or more radios (configured according to a protocol such as, e.g., PowerG, Z-wave, etc.) to wirelessly communicate with associated sensors and automation devices, interfaces to connect to wired sensors, application intelligence (e.g., processor and software resources), and communication of state to a remote application (according to a protocol such as, e.g., wireless fidelity (Wi-Fi), long term evolution (LTE), etc.).

Generally, Internet of things (IoT) is driving the proliferation of LTE category M (cat-M) and narrowband IoT (NB-IoT) devices (e.g., cheap, low power, cellular connected sensors). Deployment of LTE and Wi-Fi is becoming near ubiquitous, while inexpensive silicon for modern modulation schemes is allowing for improved performance and features for sensors. Some systems provide Wi-Fi with multiple bands, multiple-input multiple-output (MIMO) communication, mesh networking, and cheap Wi-Fi connected cameras. Moreover, computing resources are becoming available in the form of cloud computing (e.g., a private or public cloud system that provides computing and storage resources via access over a network, e.g., Amazon Web Services (AWS)), software as a service (SaaS), on-demand computing for artificial intelligence (AI) and neural networking (e.g., user independent voice recognition, facial recognition), etc. Cell phones and "smart" home assistant devices have also introduced user interaction in the form of voice UIs (e.g., Amazon Alexa, Google, Siri, etc.).

Given the above, some aspects provide a "deconstructed" security/automation system. The user interface of the deconstructed security/automation system may be provided as an application or "app" on a user device (e.g., on a user phone, tablet, computer, bring your own device (BYOD), etc.). The application intelligence of the deconstructed security/automation system may be moved to the cloud, where each customer has a virtual instance of the intelligence, and the instance runs in the cloud and communicates to the UI of a user device wherever the user is and on whatever device the user is using at a given time. The state of the deconstructed security/automation system may be communicated to a remote application (e.g., via Wi-Fi, LTE, etc.). In an aspect, the sensors of the deconstructed security/automation system and their associated radios provide reliable, 2-way, encrypted communication, and the sensors are low power and have long battery life.

In an aspect, the hardware of the deconstructed security/automation system may be configured as a box which may be located in a closet or mounted on a wall (e.g., at a garage). The box may include a router with Wi-Fi MIMO, LTE, sensor radios, and Z-wave, and may be configured for improved antenna performance. The box may have a wide area network (WAN) port to plug into a cable or digital subscriber line (DSL) router. In an aspect, the UI of the deconstructed security/automation system may be provided by an app on a user device (e.g., a phone, a tablet, etc.). The intelligence of the deconstructed security/automation system (e.g., functionality for maintaining state, deciding on actions based on state changes, etc.), voice recognition, facial recognition, etc. may be implemented in the cloud.

In an aspect, the deconstructed security/automation system provides Wi-Fi MIMO, mesh, and real router performance. Accordingly, for example, the deconstructed security/automation system may provide whole home coverage, where mesh nodes are added as needed. The deconstructed security/automation system may also support Wi-Fi cameras with high resolution and high frame rate. The deconstructed security/automation system may allow for integration with other smart devices. For example, in an aspect, the deconstructed security/automation system may allow for integration with a smart television (TV) with an app that shows sensor changes and camera views in a pop-up window while watching TV.

In an aspect, the deconstructed security/automation system implements cloud computing and storage. Accordingly, the deconstructed security/automation system may provide virtually unlimited compute power that may be scaled up or down on demand. In this aspect, the deconstructed security/automation system may allow for voice recognition and/or facial recognition as seamless features that are available from any device with a microphone/camera. In this aspect, software updates to a user's virtual instance may be flexibly scheduled/performed in the cloud as needed (unlike conventional security/automation systems where updates are performed by a dealer). Various features of the deconstructed security/automation system may be readily turned on/off and billed for. This aspect may also provide cloud storage of images and videos from cameras associated with the system.

In an aspect, the manufacturer or dealer for the deconstructed security/automation system may own the cellular contract with the customer. However, for customers that desire monitored security, state information may go from the cloud of the deconstructed security/automation system to the servers or cloud of the company providing the monitoring service.

By pushing the intelligence to the cloud, the deconstructed security/automation system may provide a "home security/automation system" that is distributed and virtual. The deconstructed security/automation system is no longer limited to a single system and the sensors that are within radio range. Instead, the deconstructed security/automation system may include an aggregate of devices that are associated with an instance of intelligence running in the cloud. As long as a device can communicate to the cloud, the device may be a part of the security/automation system. For example, the system may include IoT devices with LTE cat-M or NB-IoT radios, and the IoT devices may be geographically located anywhere (e.g., the sensors in the system do not need to be within radio range of a control panel). In an aspect, for example, multiple physical installations may be integrated into a single instance for monitoring and control. Alternatively, the system may provide one physical installation for a multi-unit building, and may then provide a separate virtual instance for each unit (e.g., provide partitions).

In an aspect, the system may include a fully integrated control panel. In an aspect, the panel may include a color liquid crystal display (LCD) touchscreen interface that provides an intuitive graphical user interface (GUI) that allows for gesture-based user interaction (e.g., touch, swipe, etc.). In one non-limiting aspect, the panel may include a multi-core processor (e.g., four processor cores) that, while waiting for sensor state changes in the security/automation system, provides additional functionality as described with reference to various aspects herein (e.g., active panel microphones below). In one non-limiting aspect, the panel may include a chipset (e.g., a Qualcomm Snapdragon chipset) that is configured to connect to the Internet via a Wi-Fi and/or cellular network. The chipset may include multiple radios for communication with premises security sensors/devices and/or premises automation sensors/devices. For example, in an aspect, the chipset may include radios for Bluetooth, PowerG, Z-Wave, etc. In an aspect, the sensors/devices of the security/automation system may be wireless and may include, for example, one or more door/window sensors, motion sensors, carbon monoxide detectors, smoke detectors, flood sensors, etc.

In one non-limiting aspect, for example, since the panel can connect to the Internet via a Wi-Fi network or a cellular network, an app may run on a user smartphone or other mobile device (e.g., a tablet, a wearable, etc.). The user may use the app to remotely control various features of a premises security/automation system, for example, by a gesture on a user interface of the app (e.g., by a touch, swipe, etc.), or view images/video from a camera. For example, the user, who may be remote from a premises and who is planning to return to the premises, may use the app to remotely turn a porch light on or to remotely change a setting on a heating, ventilation, and air conditioning (HVAC) thermostat, so that the premises is comfortable when the user arrives at the premises.

Active Panel Microphones

In one non-limiting aspect, the panel may include one or more microphones that can be utilized to monitor the ambient noise in a protected area (e.g., a premises). In one aspect, for example, the panel may include one or more software, hardware, and/or firmware modules that implement AI algorithms to recognize normal household voices and activity patterns. The user may put the panel into a monitoring mode where the panel sends an alert if the panel hears: (a) any voices in the protected area at a time when there typically is none, such as the middle of the night; (b) unknown voices in the protected area at a time when there typically is none, such as the middle of the night; (c) any unknown voices regardless of the time of day or activity period. Using this data, a user may configure the panel to either initiate an alarm or simply notify the user. In another aspect, voice activation/commands along with AI algorithms can be used to configure and use the panel. Accordingly, the panel may include built-in processing power (e.g., the digital signal processing (DSP) implemented by a processor of a chipset in the panel, such as the Qualcomm Snapdragon) and built-in sensors/microphones to implement ambient noise-related event detection, without requiring a separate sensor/device to be installed at a premises.

In an aspect, when the panel is triggered by any of the above conditions, the panel may send a corresponding notification, for example, to a mobile app through a cloud system. In an aspect, when the panel is triggered, the panel may also use a built-in camera to take still images or a video clip and send the images or the video clip to the cloud system, which may then send the images or the video clip to a mobile app or web app on a user device (e.g., a smartphone) for visual verification of an event that triggered the panel. In one non-limiting aspect, for example, AI algorithms in the panel or in the cloud are modeled to scan for unidentified persons, smoke, or other events in the video clip for visual verification. In one non-limiting aspect, for example, a video clip that includes fifteen seconds before and fifteen seconds after the actual event is sent as notification to the cloud.

In an aspect, the panel may be configured to detect events based on various noise detection models, such as continued noise level above a threshold, noise associated with multiple short sharp impacts (e.g., an intruder trying to kick down a door), gunshot detection, voice recognition to identify a request for assistance (e.g., a person falling down and asking for help), glass break detection, or detection of a particular standardized pattern of beeps such as the temporal-three pattern of a smoke detector going off (according to International Organization for Standardization (ISO) 8201 and American National Standards Institute (ANSI)/American Standards Association (ASA) S3.41 Temporal Pattern), the temporal-four pattern of a carbon monoxide detector going off, etc.

For example, in an aspect, the panel may use one or more built-in microphones to detect a fire event based on detecting the temporal-three pattern of a smoke detector alarm and/or the temporal-four pattern of a carbon monoxide detector alarm. Accordingly, the panel may implement fire detection functionality without requiring a wired or wireless connection with any fire detection sensors such as smoke detectors or carbon monoxide detectors. In one non-limiting aspect, the panel may voice annunciate fire or CO based on detecting these patterns.

In another aspect, for example, the panel may be configured to use one or more built-in microphones to perform occupancy detection (e.g., for senior care). For example, the panel may use the built-in microphones to detect the ambient noise at a premises and analyze the ambient noise to determine activity of a senior (e.g., whether the senior got out of bed, operated a kitchen appliance, watched TV, etc.). The panel may report such activity of the senior to a remote user (e.g., to a relative of the senior) via an app on a smartphone of the user. In one non-limiting aspect, for example, voice commands can be given to the panel to activate emergency services.

In an aspect, the panel uses built-in processing resources to implement AI algorithms for analyzing various discrete events and for determining what to do in response to a single detected event or in response to multiple detected events. Accordingly, an event may be a triggering point for taking certain actions. In an aspect, for example, the AI algorithms may be downloaded to the panel from a server and may be customized for each individual panel.

In an aspect, the panel may allow for integration of multiple events. For example, the panel may detect multiple unrelated events, and then correlate/infer an integrated event from the multiple unrelated events using built-in AI algorithms. For example, the panel may detect multiple front door open/close events reported by a door contact switch, while a Bluetooth radio of the panel may also detect multiple unrecognized devices/smartphones within range at the premises, and/or the panel may detect an unrecognized person by the AI algorithms running on imagery captured by the internal panel camera and/or by external cameras. The panel may then infer that a gathering is happening at the premises.

In an aspect, the built-in microphone of the panel may continuously listen and may sample the ambient noise at regular intervals to detect audio events, and at the same time the panel may receive reports of other events via various built-in radios such as a Bluetooth radio. In this aspect, the panel has intelligence to correlate multiple concurrently happening events based on an AI model. The AI model may change depending on how a user intends to correlate various concurrently happening events, for example, based on a certain anomaly or a use case desired by the user. For example, the AI model may be configured to take no action when a glass break event is detected while no other event is concurrently detected, but generate an alarm when a glass break event is detected concurrently with another event. In an aspect, the AI modeling and anomaly detection may be dynamically implemented and changed.

In an aspect, the panel may use built-in processing power and one or more built-in microphones to virtually create and simulate one or more sensors. For example, the panel may use one or more built-in microphones and added application to virtually create a fire detection sensor as described above (e.g., by detecting audio patterns of a smoke detector going off) or to virtually create a glass break detection sensor as described below. In an aspect, such virtually created and simulated sensors may either replace or augment respective dedicated physical sensors in a security/automation system of a premises.

In an aspect, the panel itself may also be virtualized. In an aspect, for example, the panel may use built-in microphones/sensors to virtualize and integrate various simulated sensors to take input in, and then the processing and intelligence applied to the input may be performed in a cloud system in communication with the panel.

Acoustic Signature Detection

In some aspects, the panel may use one or more built-in microphones to detect an acoustic signature associated with one or more events. For example, the panel may include one or more built-in microphones that can be utilized to monitor the ambient noise in a protected area and determine whether the ambient noise includes an acoustic signature associated with an event. In some aspects, for example, the panel may receive sound waves and compare them to one or more of a plurality of known acoustic signatures associated with one or more events such as: a glass break, a gunshot, a dog barking, a person shouting, a smoke detector alarm, a voice, one or more keywords, or any other number of configurable sound events.

In one non-limiting aspect, for example, the panel may perform glass break detection using one or more microphones. For example, the panel may include one or more built-in microphones that can be utilized to monitor the ambient noises in a protected area to detect a glass break event.

In an aspect, the panel may go into a low-power sleep mode, and may then wake up upon detecting a first sound from a probable glass break. After waking up, the panel may continue to analyze subsequent noises detected by the one or more microphone to determine if an actual glass break has occurred.

A glass break event generates a sound with a particular acoustic signature which starts with a thump sound and then follows with a crashing noise. Accordingly, the panel may execute an application that, using the microphones in the panel, is configured to detect a glass break event by identifying a sequence of sounds corresponding to the acoustic signature of a glass break event. For example, in an aspect, the panel has built-in processing power to execute software code to continually listen to the built-in microphones of the panel to detect a thump sound, and may then continue listening to the built-in microphones to determine if a crashing noise associated with a glass break event follows the thump sound.

Accordingly, a control panel at a premises may include built-in processing power and built-in sensors/microphones to implement glass break detection functionality without requiring a separate glass break detection sensor/device to be installed at the premises.

Cloud Communicative Sensors

In some security/automation systems, the sensors are short range devices that talk directly to a control panel using wired or wireless connections. However, in an aspect, a security/automation system includes sensors that talk directly to a cloud system, rather than going to the panel first. In an aspect, each sensor device may have a built-in cellular radio, so that the sensor device may use the cellular network to send information directly to a dedicated cloud. Such cloud communicative sensors remove the requirement for the panel to be a physical unit within a protected area. In other words, the panel may be a cloud-based application accessible on a fixed or mobile device that can be located and controlled at any geographic location. The cloud communicative sensors also allow the panel to become increasingly complex as the panel is no longer bound by physical hardware, software, or memory constraints. As technology improves, the panel application may also improve seamlessly.

In some aspect, one or more sensors may use a cellular radio to communicate with a cloud system that supports a security/automation system. In an aspect, one or more sensors may each include a radio configured for communication according to the NB-IoT protocol. The NB-IoT protocol is designed and configured at hardware and at protocol level for small widely-deployed battery-powered devices that only need to communicate infrequently, such as a water meter that connects and reports on a daily basis. In an aspect, for example, an NB-IoT radio may be included in a contact or PIR motion sensor (e.g., a door/window sensor, motion detector, etc.) such that the sensor may connect to a cellular network to send events and other information directly to the cloud.

In an aspect, a security/automation system may include a virtualized control panel and may provide state management and intelligence in a dedicated cloud that can be hosted in a private or public cluster (e.g., AWS, private data center, etc.).

Accordingly, any devices that are capable of establishing a direct cellular connection with the cloud may be configured as a part of the security/automation system, such as one or more NB-IoT sensors configured to communicate directly with the cloud using a cellular connection. In an aspect, the NB-IoT sensors of such a security/automation system may be located at various different geographic locations. For example, in one non-limiting aspect, a security system may include one or more cameras that use a cellular radio to send video clips to the cloud when the local AI algorithms detect unidentifiable persons or objects.

In an aspect, instead of configuring the security/automation system via a physical control panel, a user may use a virtual control panel provided by a mobile app that is configured as an interface to the cloud. For example, the user may use a controlling application (app) on a user device to connect to the cloud and configure the security/automation system, e.g., manage and monitor sensors (e.g., turn sensors on or off), implement new sensors in the security/automation system, remove one or more sensors from the security/automation system, etc.

In one non-limiting aspect, for example, such a virtualized control panel may allow for aggregating the security/automation system of multiple buildings together. For example, in an aspect, a user may own two properties at two different physical locations, and may use a single virtualized control panel to monitor both locations.

In an aspect, the virtualized control panel may allow for establishing a hierarchical security/automation system that includes several buildings. For example, at a highest hierarchical level, the virtualized control panel may be configured to indicate whether there are any issues reported at any of the geographical locations of buildings in a geographically distributed security/automation system, while a lower hierarchical level may provide more granularity and further details of issues reported to the security/automation system, such as a state, a city, a specific building, or a specific room where an issue was detected and reported.

In an aspect, the virtualized control panel may allow for configuring a security/automation system that blankets a region. In an aspect, the virtualized control panel may allow for configuring a security/automation system that blankets the assets of a business. In an aspect, for example, the virtualized control panel may allow for configuring a security/automation system that includes a number of NB-IoT sensors installed at various geographically distributed public utility structures. In one non-limiting aspect, for example, the virtualized control panel may allow for configuring a security/automation system that includes one or more door/window contacts, and/or cellular cameras at the entrance kiosk of state parks, national grid substations, high voltage transmission towers, and/or other national infrastructures.

In another non-limiting aspect, for example, the virtualized control panel may allow for configuring a security/automation system that includes a contact sensor at a mailbox, where the contact sensor communicates directly to the cloud to indicate at what times the mailbox has been opened. Accordingly, the security/automation system may send a notification to a user if the mailbox has been opened/accessed at an odd hour (e.g., between midnight and 5:00 am).

Alarm Event Pictures

In one non-limiting aspect, a control panel may include a built-in forward facing camera. In an aspect, the camera may be used to take a picture of the person who interacts with the panel to arm or disarm the panel and/or set-up the security/automation system and/or the panel. In an alternative or additional aspect, the camera may be used as a motion detector. In an aspect, for example, the panel may delay taking alarm event pictures until motion is detected (e.g., by the panel or by a sensor in communication with the panel) or the local AI algorithm detects an unrecognized person. Accordingly, the panel may not waste memory storage space on meaningless pictures. For example, in an aspect, the panel may detect an alarm event and trigger a siren and/or alert a monitoring center/homeowner. At the same time, the panel may wait until motion is sensed/detected (e.g., by the panel or by a sensor in communication with the panel). Only after motion is sensed/detected, the panel may begin recording video or taking pictures to assist with the determination of who or what caused the alarm event. By waiting until motion is detected or the local AI algorithm detects an unrecognized person, the panel avoids taking unnecessary pictures and therefore retains more memory for pictures that have a greater likelihood of being material to the alarm event.

In one non-limiting aspect, the panel performs motion detection by comparing subsequent frames captured by a built-in camera in the panel. In an aspect, for example, if a door is opened while the panel is in an armed state, the built-in camera continuously captures images and/or video, and the panel performs frame-by-frame comparison of the images and/or video captured by the built-in camera to detect motion based on the amount of change in the pixels of subsequent frames. In one non-limiting aspect, for example, in order to detect motion, an optimized algorithm selectively samples for pixel changes in a frame. The algorithm may be calibrated to ignore pets and other unwanted objects. After motion is detected, the panel starts recording the images/video captured by the built-in camera and sends the recorded images/video to the cloud. The cloud may then send the recorded images/video to a device of a user (e.g., a smartphone, a tablet, etc.) for viewing on an app running on the device of the user.

In one non-limiting aspect, for example, when a person disarms the panel, a user may be notified via an app on the user smartphone that the panel has been disarmed. The user may then use the app to remotely view an image or video of the person who disarmed the panel, where the image or video is taken by a built-in camera in the panel at the time the panel was disarmed or immediately after the panel was disarmed.

In another non-limiting alternative or additional aspect, the user may use the app to remotely view images and videos of the premises taken by a built-in camera of the panel. In response to determining that a service person has arrived at the premises, the user may use the app to remotely disarm the panel.

Facial Recognition by the Control Panel

In one non-limiting aspect, the control panel may include a built-in camera and may use the built-in camera to implement facial recognition. In an aspect, for example, when a person is arming or disarming the panel, the panel may use the built-in camera to take video and/or images of the person and perform facial recognition based on the captured video and/or images to identify the person and determine whether the person is legitimate and authorized to arm or disarm the panel. In an aspect, the panel may use facial recognition in addition to another form of authentication (e.g., passcode, voice recognition, etc.) to perform multi-factor authentication and determine whether the person is legitimate and authorized to arm or disarm the panel.

In an aspect, upon recognizing the person, the panel may control one or more devices to operate according to a desired setting of the recognized person. For example, the panel may turn some lights on or off, turn music or radio on or off, adjust an HVAC temperature setting to a desired temperature, etc.

In another aspect, for example, when the panel is next to a premises entry point such as a door, and a door contact sensor indicates to the panel that the door has been opened, the panel may use the built-in camera to take images of the person passing by and perform facial recognition, optionally together with voice recognition or other sensors, to determine whether the person is legitimate and authorized to enter the premises.

In an aspect, the panel may use facial recognition, optionally together with voice recognition or other sensors, to determine how many people are present at a premises and whether known or unknown people are present at the premises. In one non-limiting aspect, for example, the panel may identify, via a built-in Bluetooth radio, that a number of Bluetooth devices are in range, which indicates a possibility of multiple people being present at the premises. The panel may then use facial recognition (via a built-in security camera), and optionally together with voice recognition (via a built-in microphone) to determine how many people are present at the premises and whether any of those people are legitimate and authorized to be at the premises.

In an aspect, the panel may use a combination of the above to determine whether an unusual event is happening at the premises. For example, the panel may determine whether a number of unrecognized faces have passed by, whether a door has been opened and closed an unusually large number of times, whether an unusually large number of Bluetooth devices are in range, whether a noise sensor is indicating an unusually high amount of noise, whether an infra-red (IR) sensor is detecting an unusually large number of bodies, etc.

In an aspect, the panel may use facial recognition for generating an alarm. For example, the panel may initiate an alarm upon recognizing one or more specific individuals.

GUI Functionality

In one non-limiting aspect, the control panel may implement AI functionality for tracking the applications and functions that a particular user typically invokes and/or is allowed to access. Accordingly, when the panel recognizes a person (e.g., through voice or facial recognition), the panel may bring up and display GUI features (e.g., buttons, icons, apps, etc.) that are typically invoked by and/or associated with the recognized person.

In an alternative or additional aspect, the panel may allow for restricting one or more features for one or more recognized user. For example, the panel may allow for implementing parental control to limit access to certain features that are otherwise controllable via the panel.

In an aspect, the panel may bring up personalized GUI features of a specific person based on facial recognition using a built-in camera in the panel, as described above.

In an aspect, the AI algorithms for facial recognition are executed by a built-in multicore processor of the panel. In an alternative or additional aspect, the panel may send the images/video captured by the built-in camera to the cloud, and the AI algorithms for facial recognition are executed in the cloud. The cloud then sends the outcome of the facial recognition back to the panel. For example, if the cloud recognizes a person by applying facial recognition to images/video captured by the built-in camera of the panel, the cloud may send the identity of the recognized person to the panel.

Window/Door Sensors using Capacitive Sensing

In one non-limiting aspect, a security/automation system may include a window/door sensor that implements capacitive sensing to detect if a door or window is open or closed. Such sensors are beneficial because the sensors do not use the conventional magnetic reed switches or other mechanical designs that require two separate pieces to be installed.

Specifically, for example, some sensors used in security/automation systems for detecting whether a window/door is open or closed use a magnet and reed switch. The sensor containing the reed switch, or other magnetic sensing device, is typically mounted on or in the window/door frame, and the magnet is mounted on the window/door. When the window/door is closed, the magnet is in close proximity to the reed switch, keeping it closed. When the window/door is opened, the magnet moves away from the reed switch, causing it to open. The sensor detects the change of state of the reed switch and transmits to a control panel, using wired or wireless communication. These sensors therefore have two components—the sensor device, and the associated magnet.

It is desired to make the window/door sensor as small and inexpensive as possible. As small magnets with high magnetic field strength are a significant part of the overall sensor cost, it is advantageous to eliminate the magnet and use a different method to detect if the window/door is open or closed.

Accordingly, some aspects sense the proximity of the window/door to the window/door frame without a magnet by measuring the capacitance between two conductive measurement points. When the window/door is open, the capacitance will be lower compared to when the window/door is closed and physically close to the two measurement points. A microcontroller with appropriate circuitry may periodically measure the capacitance and then determine whether the window/door is open or closed.

Additionally, in some aspects, the sensing device may have a mode to self-calibrate when it is installed so it knows the difference between open and closed, thus accounting for differences in capacitance caused by different materials (such as wood, metal, masonry, etc.), different physical spacing between the sensor and the window/door, etc.

Additionally, in some aspects, the device may keep a long term history of any drift in values caused (for example) by changes in the moisture content of a wood window/door, changes in spacing caused by seasonal shifting or settling of construction, painting, etc.

In an aspect, for example, the window/door sensor includes an electrical circuit capable of measuring the capacitance between two closely-spaced metal elements, and the capacitance between the two metal elements changes depending on their proximity to the window/door. The metal elements can be implemented as patterns in the copper plating on a printed circuit board, or as separate metal elements connected to the measurement circuitry.

In an aspect, the window/door sensor may be calibrated/trained during installation by opening and closing the window/door multiple times. In an aspect, for example, in order to calibrate the sensor, the capacitive coupling of the sensor may be measured at different states of the window/door (e.g., fully open, fully closed, half open, etc.).

In an aspect, the sensor threshold settings derived by calibration may vary depending on the material of the window/door (e.g., metal, wood, glass, etc.) and/or depending on the location/orientation of the sensor on the window/door and/or on the frame of the window/door.

Bass Augmentation Sub-System (BASS)

In one non-limiting aspect, a control panel may include multiple primary speakers and a modular back speaker. In an aspect, the panel implements a modular speaker that may be attached or removed and which improves the sound qualities of the panel. The panel may use the modular speaker and one or more microphones to communicate with users through voice commands and responses, and may also use the modular speaker to broadcast other messages and music. Accordingly, the panel may function as a home appliance that communicates clearly and effectively.

In an aspect, the panel may allow for audio as well as video user interaction. For example, the panel may include one or more speakerphones and microphones. In one non-limiting aspect, for example, if the panel goes into an alarm condition, the panel may report an alarm to a monitoring center and may use a cellular interface of the control panel to establish a two-way voice call between the panel and the monitoring center. For example, in an aspect, in response to a reported event, the monitoring center may make a voice call to the panel and ask a homeowner, via one or more speakerphones on the panel, about any emergencies existing at the premises and/or whether the homeowner requires assistance.

Diagnostic Tool

One non-limiting aspect implements a diagnostic tool that tests, measures, and/or graphically maps the signal strength of the connection between one or more sensors and the control panel. Accordingly, a technician may do diagnostic analysis by using the panel itself, rather than needing to use additional signal strength meters, etc. This may speed up the installation of a security/automation system and/or provide a more robust installed security/automation system.

In one non-limiting aspect, the diagnostic tool may measure the received signal strength of wireless signals between one or more sensors and one or more radios in the panel (e.g., cellular or other radios). In an aspect, the diagnostic tool reads the received signal strength indicator (RSSI) of a radio. For example, the diagnostic tool may listen to a radio and determine an instantaneous RSSI related to the background noise and plot the instantaneous RSSI on a graph over time. Accordingly, a technician/installer may use the graph to identify sources of noise in the environment that would interfere with the operation of the security/automation system.

For example, in an aspect, RSSI of sensor radios is sent to the cloud and historic signal strength data is maintained. By observing the historic graphical information over time, a technician/installer may notice that operation of an electrical device is producing a signal that interferes with the signal transmitted by a sensor or camera that is trying to communicate with the panel. The technician may then adjust the installation of the panel, sensor, or camera and/or the electrical device to mitigate the interference.

In an aspect, the graph may also display the average of the background noise by a first horizontal bar, and may also display a minimum acceptable sensor RSSI by a second horizontal bar that is above the first horizontal bar. Accordingly, the technician/installer may observe the graph over time and discern whether the RSSI of a sensor is above the second bar, thus being acceptable. In an aspect, various data points in the graph may be color-coded to indicate different signal quality categories, e.g., good signal, marginal signal, unreliable signal, etc. In an aspect, for example, when the graph color-codes a data point of a sensor as being marginal or unreliable, the technician/installer may reposition the sensor and/or reposition the panel until subsequent data points of the sensor are color-coded in the graph as being a good signal.

In an aspect, repositioning the sensor may include changing the location and/or changing an orientation of the sensor. Similarly, repositioning the panel may include changing a location and/or changing an orientation of the panel.

Use of a Short Range Communication Radio for Disarming

In one non-limiting aspect, a short range communication radio of the control panel may be used to determine whether a known device is in range, and the control panel may be automatically disarmed in response to the known device being in range. In one non-limiting aspect, an entrance of a premises may also be unlocked in response to the known device being in range. In an aspect, the short range communication radio may be, for example, but is not limited to, a Bluetooth radio, a Bluetooth Low Energy (BLE) radio, a near-field communication (NFC) radio, etc.

In one non-limiting aspect, for example, when a panel recognizes a BLE signal from a known device, the panel is automatically disarmed. In an aspect, instead of arming/disarming the panel by determining the exact location of a user, the panel arms/disarms based on detecting that a user is within BLE range and that a BLE device of the user has been registered with the panel.

In one non-limiting aspect, for example, a user smartphone may be paired with the panel in a premises, e.g., using a built-in Bluetooth radio in the panel. In one non-limiting aspect, for example, when the user approaches a front or back door of the premises, the built-in Bluetooth radio in the panel may detect that the user smartphone is within range. In response to detecting that the user smartphone is within range, the panel may disarm and send a Z-Wave command to unlock the door and/or turn on the lights at the premises. In one non-limiting aspect, if the user opens the back door of the premises, a sensor on the back door may send a signal to the panel to indicate that the back door has been opened. In response, the panel may, for example, chime and play an audio message such as "Back door opened!" In another non-limiting aspect, the built-in Bluetooth radio in the panel may be used to pair new security or home automation sensors with the panel. For example, in an aspect, pairing the sensor may be performed from a mobile phone app by scanning the sensor QR code and sending the sensor details to the panel using Bluetooth.

Turning now to the figures, example aspects are depicted with reference to one or more components described herein, where components in dashed lines may be optional.

Referring to FIG. 1, a security/automation system 100 of a premises 102 may include various security devices 104 (e.g., sensors, cameras, etc.) installed/positioned throughout the premises 102. In some aspects, at least some of the security devices 104 may include a first cellular radio 116 for communicating directly (e.g., via a cellular network) with a cloud system 120 that implements at least some of the functionalities provided by the system 100, as described herein with reference to various aspects. Alternatively and/or additionally, at least some of the security devices 104 may communicate with the cloud system 120 via another wired or wireless connection, for example, via a physical Ethernet connection.

In an aspect, at least some of the security devices 104 may communicate with a control panel 106 that is physically installed at the premises 102. In an aspect, for example, at least some of the security devices 104 may include one or more first other radios 118 (e.g., Bluetooth, PowerG, Z-Wave, Zigbee, etc.) for communicating with the panel 106 that includes one or more corresponding second other radios 134 (e.g., Bluetooth, PowerG, Z-Wave, etc.). Alternatively and/or additionally, at least some of the security devices 104 may communicate with the panel 106 via another wired or wireless connection, for example, via a physical Ethernet connection.

In an aspect, the system 100 may be at least partially configured and/or controlled via a first UI 122 of the panel 106 to implement at least some of the functionalities described herein with reference to various aspects. In an aspect, the panel 106 may include one or more built-in cameras 126, one or more built-in microphones 128, and/or one or more built-in speakers 130 to implement at least some of the functionalities described herein with reference to various aspects.

In some aspects, the panel 106 may include a second cellular radio 132 for communicating directly (e.g., via a cellular network) with the cloud system 120 to implement at least some of the functionalities provided by the system 100, as described herein with reference to various aspects. Alternatively and/or additionally, the panel 106 may communicate with the cloud system 120 via another wired or wireless connection, for example, via a physical Ethernet connection.

In some alternative or additional aspects, the system 100 may be at least partially configured and/or controlled via a second UI 124 of a virtual control panel 110 provided via an app 112 executing on a user device 114 (e.g., a mobile device). In some aspects, the user device 114 may include a third cellular radio 136 for communicating directly (e.g., via a cellular network) with the cloud system 120 to implement at least some of the functionalities provided by the system 100, as described herein with reference to various aspects. Alternatively and/or additionally, the user device 114 may communicate with the cloud system 120 via another wired or wireless connection, for example, via a physical Ethernet connection. In some aspects, the user device 114 may also include one or more other radios 138 (e.g., Bluetooth, PowerG, Z-Wave, etc.).

Figure 2:
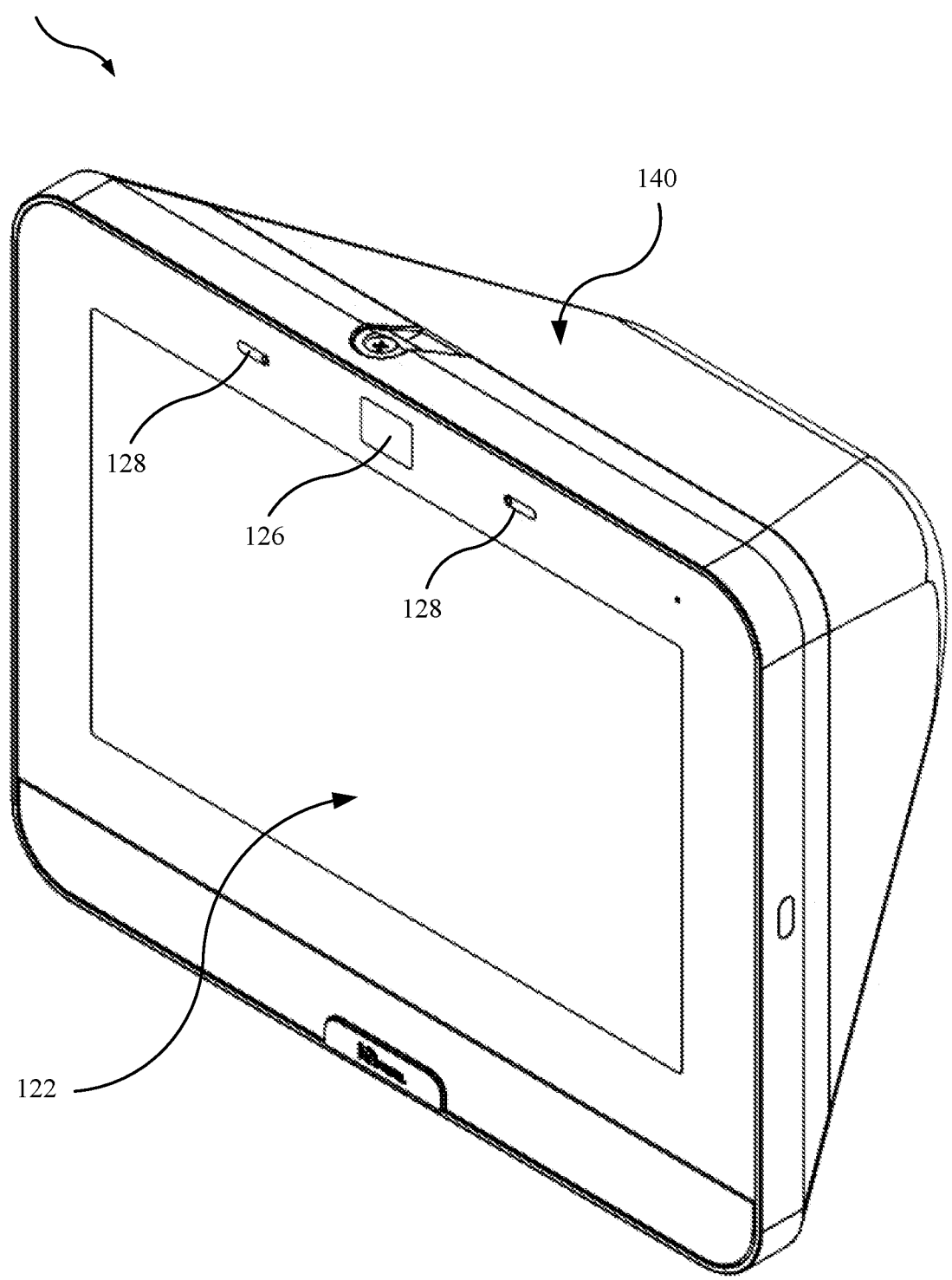
FIG. 2 is an isometric view of an example of a control panel in FIG. 1, according to some aspects.

Referring to FIG. 2, in an aspect, the panel 106 may include a removable back speaker 140 that may also provide support as a stand for placing the panel 106 on a surface such as a countertop or a desk.

Figure 3:
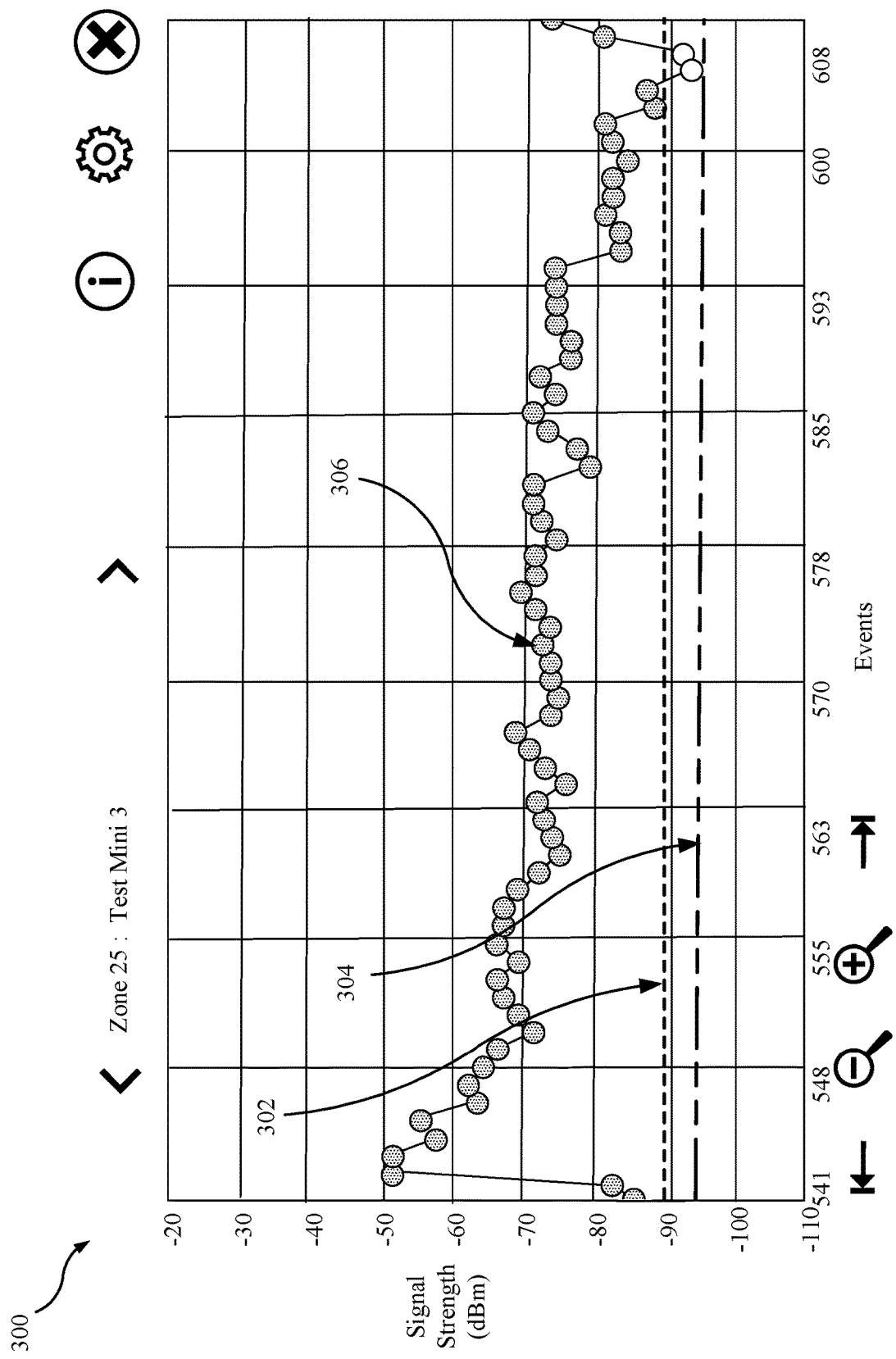
FIG. 3 is a first example graphical user interface (GUI) of a diagnostic tool in a control panel in FIG. 1, according to some aspects.

FIG. 3 includes a first non-limiting example of a GUI 300 of the diagnostic tool described above with reference to some aspects. In FIG. 3, a test/installer tool graph of the signal strength 306 changes from −50 dBm to less than −90 dBm as a sensor is progressively moved away from the control panel 106. The graph also displays the average of the background noise by a first horizontal bar 304, and also displays a minimum acceptable sensor RSSI by a second horizontal bar 302 that is above the first horizontal bar 304.

Figure 4:
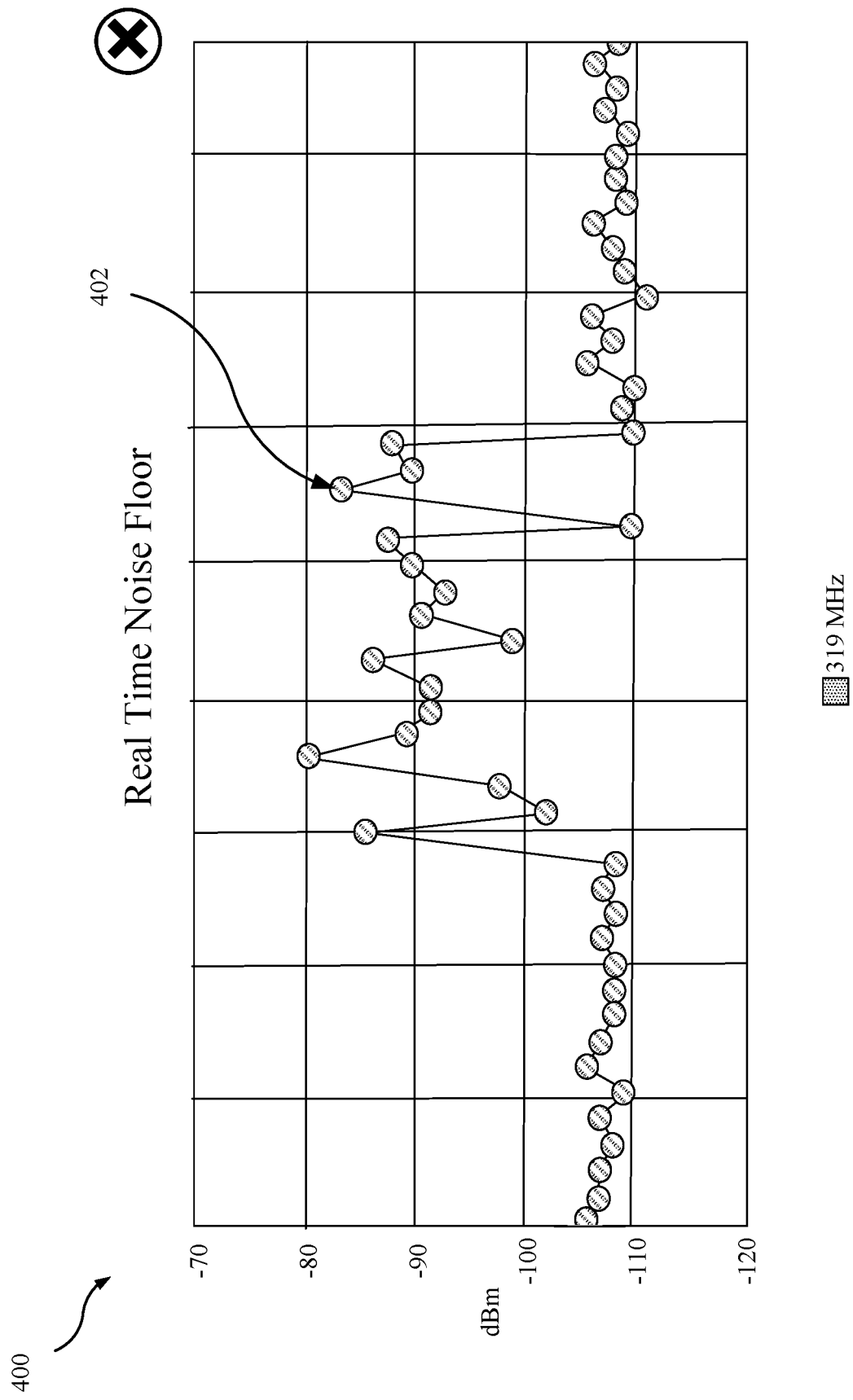
FIG. 4 is a second example GUI of a diagnostic tool in a control panel in FIG. 1, according to some aspects.

FIG. 4 includes a second non-limiting example of a GUI 400 of the diagnostic tool described above with reference to some aspects. In FIG. 4, a graph shows a real-time noise floor measurement 402 at the control panel 106, indicating the interference caused by a switching power supply in an LED light fixture. Specifically, the noise floor is slightly above −110 dBm when the LED light is off, but jumps up to the neighborhood of −90 dBm when the LED light is turned on, and drops down to −110 dBm when the LED light is turned back off again. In other example aspects, alternative or additional sources of noise/interference may include, for example, a microwave oven, a cordless phone, etc.

Figure 5:
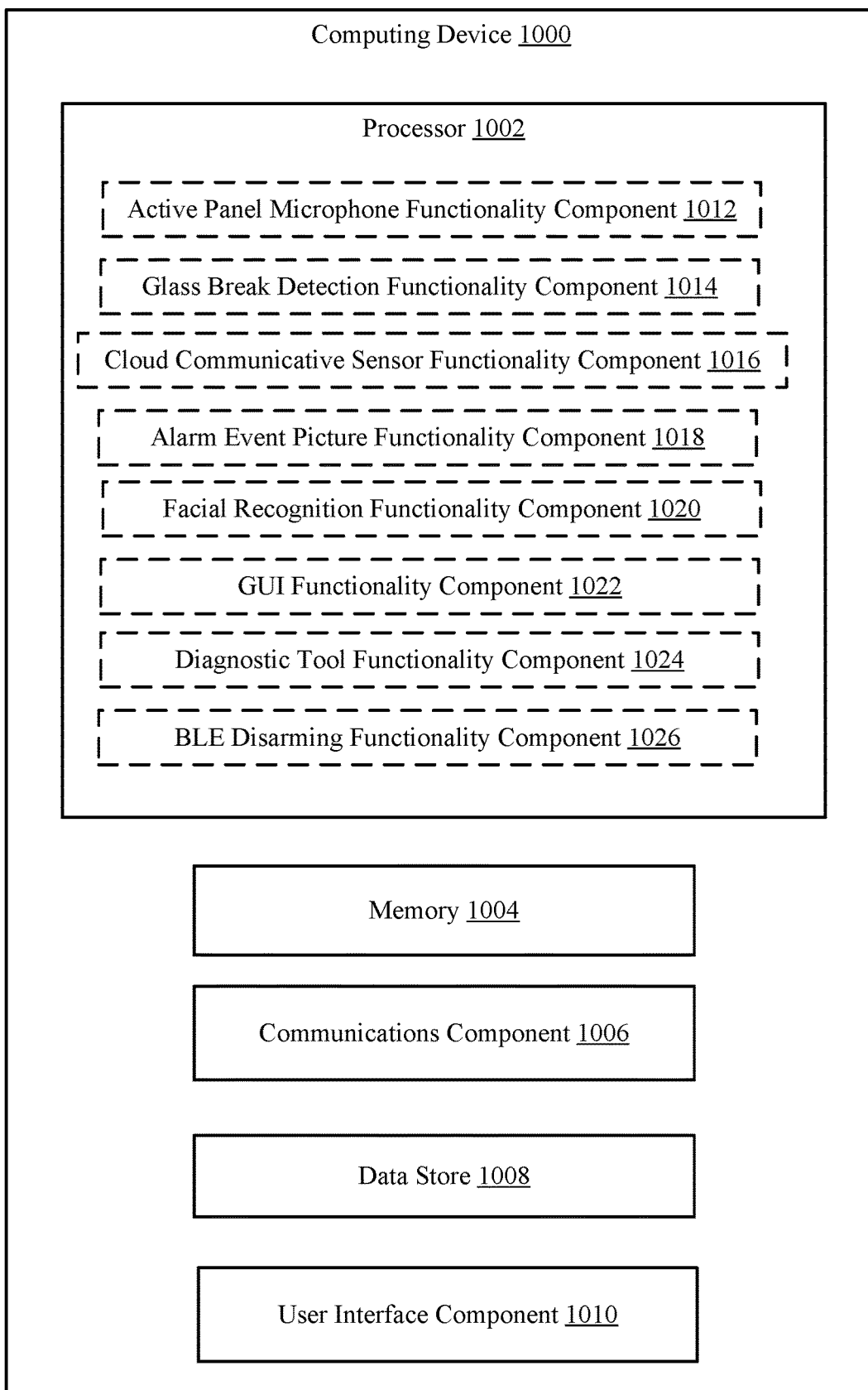
FIG. 5 is a block diagram of an example computing device which may implement all or a portion of any component in FIG. 1, according to some aspects.

FIG. 5 illustrates an example block diagram providing details of computing components in a computing device 1000 that may implement all or a portion of one or more components in a control panel, a cloud system, a sensor device, a user device (e.g., a smartphone, a tablet, a laptop computer, a desktop computer, etc.), or any other component described above. The computing device 1000 includes a user processor 1002 which may be configured to execute or implement software, hardware, and/or firmware modules that perform any functionality described above with reference to one or more components in a control panel, a cloud system, a sensor device, a user device, or any other component described above. For example, the processor 1002 may be configured to execute an active panel microphone functionality component 1012 to provide active panel microphone functionality, a glass break detection functionality component 1014 to provide glass break detection functionality, a cloud communicative sensor functionality component 1016 to provide cloud communicative sensor functionality, an alarm event picture functionality component 1018 to provide alarm event picture functionality, a facial recognition functionality component 1020 to provide facial recognition functionality, a GUI functionality component 1022 to provide GUI functionality, a diagnostic tool functionality component 1024 to provide diagnostic tool functionality, and/or a BLE disarming functionality component 1026 to provide functionality for using BLE for disarming, as described herein with reference to various aspects.

The processor 1002 may be a micro-controller and/or may include a single or multiple set of processors or multi-core processors. Moreover, the processor 1002 may be implemented as an integrated processing system and/or a distributed processing system. The computing device 1000 may further include a memory 1004, such as for storing local versions of applications being executed by the processor 1002, related instructions, parameters, etc. The memory 1004 may include a type of memory usable by a computer, such as random access memory (RAM), read only memory (ROM), tapes, flash drives, magnetic discs, optical discs, volatile memory, non-volatile memory, and any combination thereof.

Additionally, the processor 1002 and the memory 1004 may include and execute an operating system executing on the processor 1002, one or more applications, display drivers, etc., and/or other components of the computing device 1000.

Further, the computing device 1000 may include a communications component 1006 that provides for establishing and maintaining communications with one or more other devices, parties, entities, etc., utilizing hardware, software, and services. The communications component 1006 may carry communications between components on the computing device 1000, as well as between the computing device 1000 and external devices, such as devices located across a communications network and/or devices serially or locally connected to the computing device 1000. For example, the communications component 1006 may include one or more buses, and may further include transmit chain components and receive chain components associated with a wireless or wired transmitter and receiver, respectively, operable for interfacing with external devices.

Additionally, the computing device 1000 may include a data store 1008, which can be any suitable combination of hardware and/or software, that provides for mass storage of information, databases, and programs. For example, the data store 1008 may be or may include a data repository for applications and/or related parameters not currently being executed by processor 1002. In addition, the data store 1008 may be a data repository for an operating system, application, display driver, etc., executing on the processor 1002, and/or one or more other components of the computing device 1000.

The computing device 1000 may also include a user interface component 1010 operable to receive inputs from a user of the computing device 1000 and further operable to generate outputs for presentation to the user (e.g., via a display interface to a display device). The user interface component 1010 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 1010 may include one or more output devices, including but not limited to a display interface, a speaker, a haptic feedback mechanism, a printer, any other mechanism capable of presenting an output to a user, or any combination thereof.

Some further aspects are provided below.

1. A control panel comprising:
   one or more microphones;
   at least one memory; and
   at least one processor coupled with the at least one memory, wherein the at least one processor is configured to:
   monitor an ambient noise via the one or more microphones; and
   determine whether the ambient noise is indicative of a security event.
2. The control panel of clause 1, wherein, in response to determining that the ambient noise is indicative of the security event, the at least one processor is further configured to initiate an alarm or send a notification to a cloud system.
3. The control panel of clause 1, wherein, in response to determining that the ambient noise is indicative of the security event, the at least one processor is further configured to:
   capture one or more still images or videos via a camera of the control panel; and
   send the one or more still images or videos to a cloud system, wherein the cloud system is configured to send the one or more still images or videos to a device of a user for viewing on an app running on the device of the user.

4. The control panel of clause 1, wherein, to determine whether the ambient noise is indicative of the security event, the at least one processor is further configured to determine whether the ambient noise includes one or more known or unknown voices.

5. The control panel of clause 1, wherein, to determine whether the ambient noise is indicative of the security event, the at least one processor is further configured to determine whether the ambient noise is continually above a threshold level for longer than a time period.

6. The control panel of clause 1, wherein, to determine whether the ambient noise is indicative of the security event, the at least one processor is further configured to determine whether the ambient noise includes a sequence of short sharp impacts.

7. The control panel of clause 1, wherein the security event comprises a fire event, wherein, to determine whether the ambient noise is indicative of the fire event, the at least one processor is further configured to determine whether the ambient noise includes a standardized pattern of beeps associated with activation of a fire detection device in response to the fire event.

8. The control panel of clause 1, wherein the security event comprises a fire event, wherein, to determine whether the ambient noise is indicative of the fire event, the at least one processor is further configured to determine whether the ambient noise includes at least one of a temporal-three pattern associated with a smoke detector going off or a temporal-four pattern associated with a carbon monoxide detector going off.

9. The control panel of clause 1, wherein, to determine whether the ambient noise is indicative of the security event, the at least one processor is further configured to perform occupancy detection based on the ambient noise.

10. The control panel of clause 1, wherein, to determine whether the ambient noise is indicative of the security event, the at least one processor is further configured to:
determine, based on the ambient noise, whether there is an activity within a monitored area; and
send a notification to a cloud system in response to detecting the activity within the monitored area.

11. The control panel of clause 1, wherein, to determine whether the ambient noise is indicative of the security event, the at least one processor is further configured to execute an artificial intelligence module locally at the control panel.

12. The control panel of clause 11, wherein the artificial intelligence module is downloaded to the control panel from a server, wherein the artificial intelligence module is customized for the control panel.

13. The control panel of clause 11, wherein the artificial intelligence module is configured to determine an action in response to a single detected event or in response to multiple concurrently-detected discrete events.

14. The control panel of clause 11, wherein the artificial intelligence module is configured to integrate multiple concurrently-detected discrete events to infer that an integrated event is happening.

15. The control panel of clause 14, wherein the multiple concurrently-detected discrete events includes at least two events detected using at least two different sensor types.

16. The control panel of clause 14, wherein the multiple concurrently-detected discrete events includes at least one event detected based on the ambient noise using the one or more microphones.

17. The control panel of clause 14, wherein the multiple concurrently-detected discrete events includes at least one event detected based on a wired or wireless signal received by the control panel from a sensor.

18. The control panel of clause 11, wherein the artificial intelligence module is configured to integrate multiple concurrently-detected discrete events based on one or more user preferences received via the control panel.

19. The control panel of clause 1, wherein the security event is associated with an acoustic signature, wherein, to determine whether the ambient noise is indicative of the security event, the at least one processor is further configured to determine whether the ambient noise includes the acoustic signature.

20. The control panel of clause 19, wherein the security event comprises a glass break event, wherein, to determine whether the ambient noise is indicative of the glass break event, the at least one processor is further configured to:
detect a first noise by the one or more built-in microphones, while operating in a low-power sleep mode;
wake up from the low-power sleep mode in response to determining that the first noise is associated with a first sound in the acoustic signature of a probable glass break; and
analyze subsequent noises to determine whether an actual glass break has occurred, based on subsequent sounds in the acoustic signature.

21. The control panel of clause 19, wherein the first sound comprises a thump sound, wherein the subsequent sounds comprise crashing sounds.

22. A system comprising at least one sensor device that includes:
a sensor element configured to sense a physical phenomenon;
a cellular radio;
a memory; and
at least one processor coupled with the memory, wherein the at least one processor is configured to:
receive a signal from the sensor element, the signal being indicative of the physical phenomenon as sensed by the sensor;
determine whether a level of the signal element is indicative of an alarm condition; and
use the cellular radio to send a notification directly to a cloud system in response to the level of the signal being indicative of the alarm condition.

23. The system of clause 22, wherein the cellular radio is operable according to narrowband Internet of things "NB-IoT" protocol.

24. The system of clause 22, wherein the at least one sensor device comprises a fire detection sensor.

25. The system of clause 22, further comprising a virtual control panel implemented as a cloud-based application executable on a user device, wherein the virtual control panel is configured to communicate with the cloud system to interact with or configure the system.

26. The system of clause 25, further comprising at least two sensor devices located at two different geographical locations, wherein each one of the at least two sensor devices is configured to communicate directly with the cloud system, wherein the virtual control panel is configured to communicate with the cloud system to configure the at least two sensors or to receive information communicated by the at least two sensors.

27. A control panel comprising:
at least one camera;
at least one memory; and
at least one processor coupled with the at least one memory, wherein the at least one processor is configured to:
determine that a security event has happened; and
take one or more still images or videos by the at least one camera subsequent to determining that the security event has happened.

28. The control panel of clause 27, wherein the at least one camera comprises a front-facing camera.

29. The control panel of clause 27, wherein the security event is associated with a motion, wherein, in order to determine that the security event has happened, the at least one processor is further configured to detect the motion using the at least one camera.

30. The control panel of clause 31, wherein, in response to determining that the security event has happened, the at least one processor is further configured to initiate an alarm or send a notification to a cloud system.

31. The control panel of clause 27, wherein the at least one processor is further configured to send the one or more still images or videos to a cloud system, wherein the cloud system is configured to send the one or more still images or videos to a device of a user for viewing on an app running on the device of the user.

32. The control panel of clause 27, wherein the security event is associated with identification or authentication of a user, wherein the at least one processor is further configured to use the one or more still images or videos to perform facial recognition.

33. The control panel of clause 32, wherein the security event comprises a user interaction with the control panel.

34. The control panel of clause 32, wherein the security event comprises arming or disarming the control panel.

35. The control panel of clause 32, wherein the at least one processor is further configured to perform a multi-factor authentication based on the facial recognition and at least one other form of authentication.

36. The control panel of clause 32, wherein, in response to the user being identified or authenticated, the at least one processor is further configured to control one or more devices to operate according to a desired setting of the user.

37. The control panel of clause 27, wherein the security event is associated with activation of a door switch of a door located next to the control panel.

38. The control panel of clause 27, further comprising a Bluetooth radio, wherein the security event is associated with one or more Bluetooth devices being in range, wherein, in order to determine that the security event has happened, the at least one processor is further configured to use the Bluetooth radio to detect the one or more Bluetooth devices.

39. The control panel of clause 38, wherein the at least one processor is further configured to:
use the one or more still images or videos to perform facial recognition; and
determine, based on the facial recognition, whether one or more individuals associated with the one or more Bluetooth devices are present at a premises.

40. The control panel of clause 38, wherein the control panel further comprises one or more microphones, wherein the at least one processor is further configured to:
record an ambient noise by the one or more microphones;
use the ambient noise to perform voice recognition;
use the one or more still images or videos to perform facial recognition; and
determine, based on the voice recognition and the facial recognition, whether one or more individuals associated with the one or more Bluetooth devices are present at a premises.

41. A control panel comprising:
at least one camera or microphone;
a display configured to provide a graphical user interface;
at least one memory; and
at least one processor coupled with the at least one memory, wherein the at least one processor is configured to:
perform at least one of a voice recognition or a facial recognition, using the at least one camera or microphone; and
present, on the display, the graphical user interface including features associated with an individual recognized according to at least one of the voice recognition or the facial recognition.

42. The control panel of clause 41, wherein, in order to perform at least one of the voice recognition or the facial recognition, the at least one processor is further configured to execute an artificial intelligence module locally at the control panel.

43. The control panel of clause 41, wherein, in order to perform at least one of the voice recognition or the facial recognition, the at least one processor is further configured to:
send data captured by the at least one camera or microphone to a cloud system; and
receive an outcome of the voice recognition or the facial recognition from the cloud system, responsive to sending the data.

44. A door/window displacement detector comprising a capacitive sensing circuit configured to indicate whether a door/window is open or close.

45. A control panel comprising:
at least one primary speaker configured to broadcast a first sound toward a front or a side of the control panel; and
a removable back speaker removably attachable to a back side of the control panel and configured to broadcast a second sound toward the back side of the control panel.

46. A control panel comprising:
at least one memory including a diagnostic tool; and
at least one processor coupled with the at least one memory, wherein the at least one processor is configured to:
execute the diagnostic tool locally at the control panel to at least one of test, measure, or graphically map a signal strength of a wired or wireless connection between the control panel and at least one sensor configured to communicate with the control panel over the wired or wireless connection.

47. A control panel comprising:
a short range communication radio;
at least one memory; and
at least one processor coupled with the at least one memory, wherein the at least one processor is configured to:

receive a short range communication signal transmitted by a device, using the short range communication radio; and automatically disarm the control panel responsive to recognizing the device as a known device.

48. The control panel of clause 47, wherein the short range communication radio comprises a Bluetooth radio, a Bluetooth low energy "BLE" radio, or a near-field communication "NFC" radio.

Figure 6:
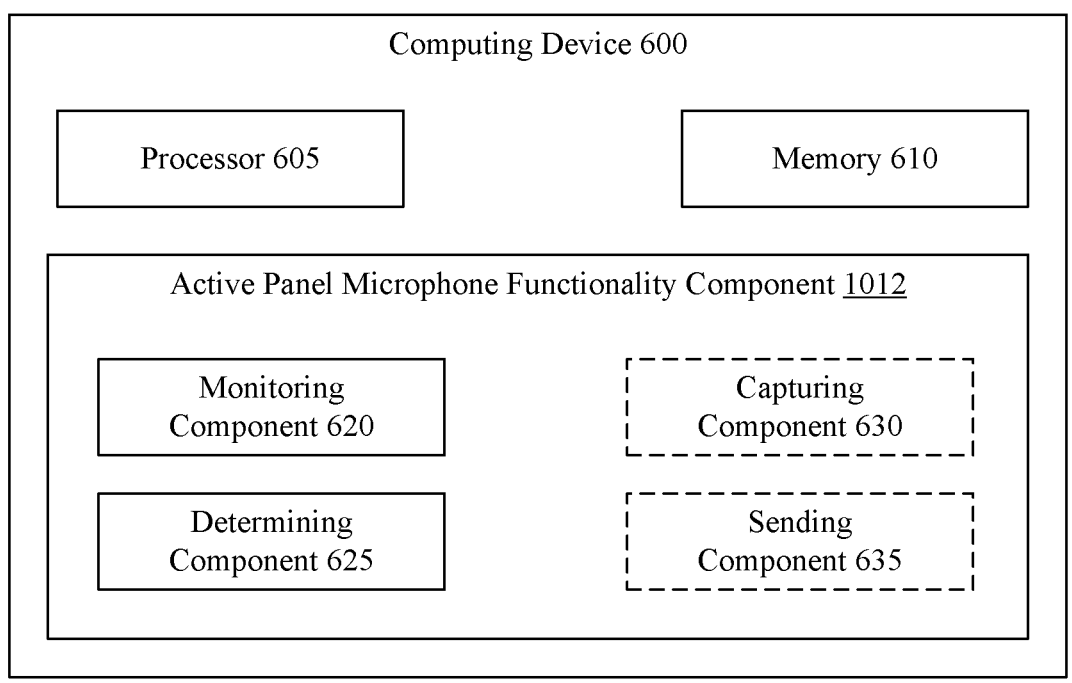
FIG. 6 is a block diagram of example components of a computing device which may implement all or a portion of a control panel in FIG. 1 configured for event detection using active built-in microphones, according to some aspects.
Figure 7:
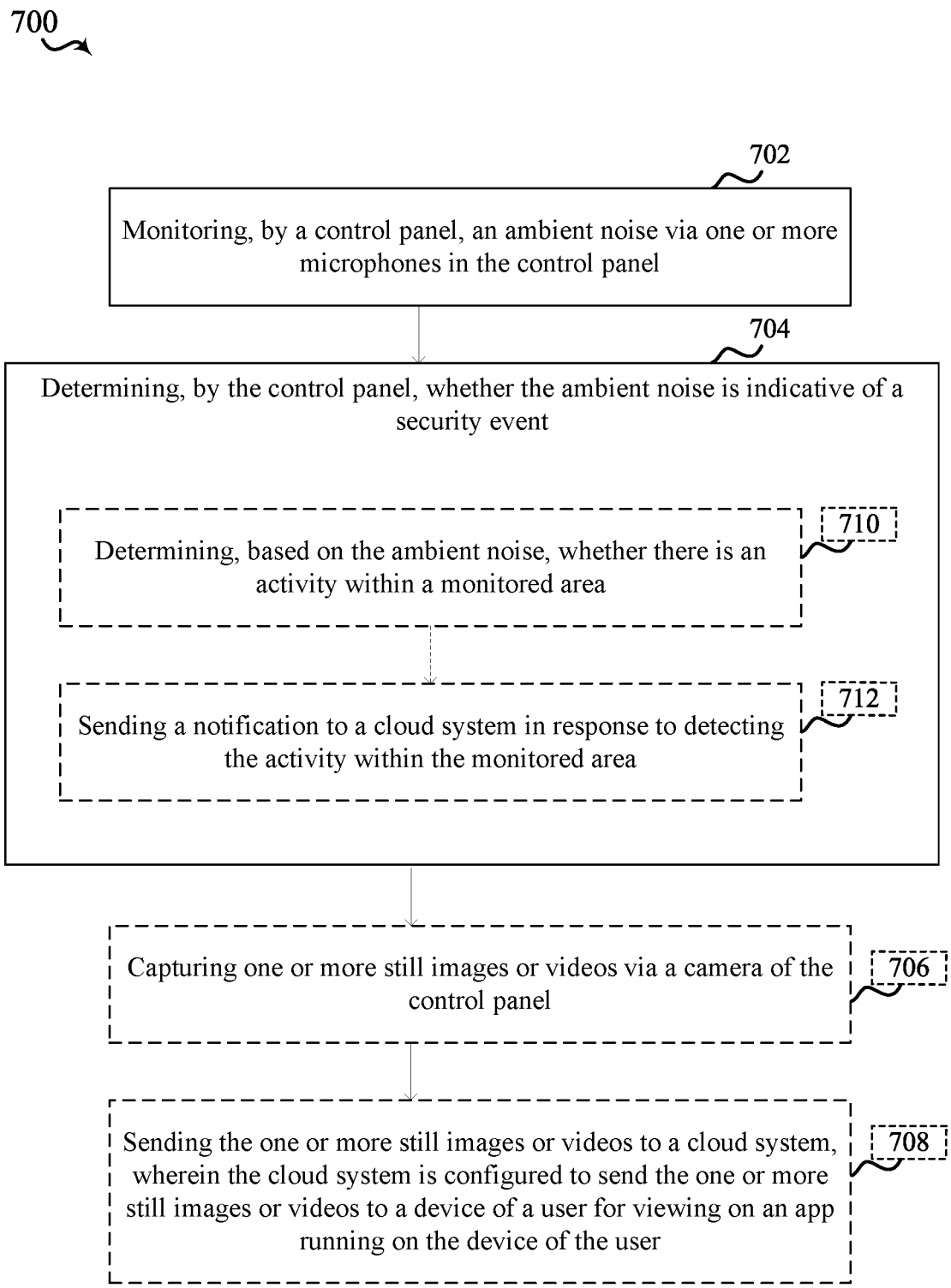
FIG. 7 is a flow diagram of an example method for event detection using active built-in microphones, according to some aspects.

Referring to FIG. 6 and FIG. 7, in operation for active panel microphone functionality, computing device 600 may implement at least a portion of one or more components in FIGS. 1-5 above, such as all or at least a portion of the control panel 106 in FIG. 1, and may perform method 700 such as via execution of active panel microphone functionality component 1012 by processor 605 and/or memory 610. Specifically, computing device 600 may be configured to perform method 700 for performing an aspect of active panel microphone functionality, as described herein. It should be noted that computing device 600, processor 605, and memory 610 may be the same or similar to computing device 1000, processor 1002, and memory 1004 as described above with respect to FIG. 5.

At block 702, the method 700 includes monitoring, by a control panel, an ambient noise via one or more microphones in the control panel. For example, in an aspect, computing device 600, processor 605, memory 610, active panel microphone functionality component 1012, and/or monitoring component 620 may be configured to or may comprise means for monitoring, by a control panel, an ambient noise via one or more microphones in the control panel.

For example, the monitoring at block 702 may include the control panel 106, that includes one or more built-in microphones 128, using the monitoring component 620 to control the one or more built-in microphones 128, e.g., turn them on, adjust their sound detecting capabilities, etc., to obtain sound waves for analysis and monitor the ambient noise in a protected area (e.g., the premises 102). For instance, the ambient noise may be any noise or sounds in the environment adjacent to or receivable by the one or more built-in microphones 128 in the control panel 106.

At block 704, the method 700 includes determining, by the control panel, whether the ambient noise is indicative of a security event. For example, in an aspect, computing device 600, processor 605, memory 610, active panel microphone functionality component 1012, and/or determining component 625 may be configured to or may comprise means for determining, by the control panel, whether the ambient noise is indicative of a security event.

For example, in an aspect, the determining at block 704 may include the control panel 106 using the determining component 625 to determine whether the ambient noise captured by the one or more built-in microphones 128 of the control panel 106 is indicative of a security event happening at the premises 102. For example, the control panel 106 may execute one or more software, hardware, and/or firmware modules to compare the obtained sound waves associated with the monitoring of the ambient noise in a protected area (e.g., the premises 102), compare characteristics of the sound waves, to one or more known sound waves/patterns associated with one or more security events. For instance, the one or more known sound waves may be patterns of sound waves, e.g., frequency over time of a sound associated with an event that produces a sound. The determining component 625 may attempt to match, within one or more thresholds, one or more of the characteristics of the ambient noise, e.g., a pattern of frequency over time of the noise, with known characters of the one or more known sound waves. If the comparison determines that one or more of the characteristics are an exact match, or within the threshold of matching, a corresponding one or more known characteristics of a known sound wave, then the determining component 625 may identify at least the matching portion of the ambient noise indicating occurrence of the security event associated with the matching, known sound wave.

In an optional aspect, at block 706, the method 700 may further include capturing one or more still images or videos via a camera of the control panel. For example, in an aspect, computing device 600, processor 605, memory 610, active panel microphone functionality component 1012, and/or capturing component 630 may be configured to or may comprise means for capturing one or more still images or videos via a camera of the control panel.

For example, the capturing at block 706 may include the control panel 106, upon detecting a security event at the premises 102 based on ambient noise captured by the one or more built-in microphones 128 of the control panel 106, using the capturing component 630 to control one or more built-in cameras 126 of the control panel 106, e.g., turn them on, adjust their image/video capturing capabilities, etc., to take still images or a video clip at the premises 102. For instance, the captured still images or videos may capture the environment adjacent to or in a field of view of a forward facing built-in camera 126 of the control panel 106.

In an optional aspect, at block 708, the method 700 may further include sending the one or more still images or videos to a cloud system, wherein the cloud system is configured to send the one or more still images or videos to a device of a user for viewing on an app running on the device of the user. For example, in an aspect, computing device 600, processor 605, memory 610, active panel microphone functionality component 1012, and/or sending component 635 may be configured to or may comprise means for sending the one or more still images or videos to a cloud system, wherein the cloud system is configured to send the one or more still images or videos to a device of a user for viewing on an app running on the device of the user.

For example, the sending at block 708 may include the control panel 106 using the sending component 635, which may include or may be associated with a wired or wireless transmitter or transceiver, to send the images or the video clip captured by the one or more built-in cameras 126 of the control panel 106 to a cloud system 120 (e.g., over the Internet, via a wireless connection, etc.), which may send the images or the video clip to an app 112 (e.g., a mobile app or web app) on a user device 114 (e.g., a smartphone) for visual verification of an event that triggered the control panel 106. In one non-limiting aspect, for example, a video clip that includes fifteen seconds before and fifteen seconds after the actual event is sent by the control panel 106 as notification to the cloud system 120.

In some optional aspects, the determining at block 704 of method 700 may include an activity detection action at block 710 and a cloud notification action at block 712.

For example, in an optional aspect, at block 710, the method 700 may further include determining, based on the ambient noise, whether there is an activity within a monitored area. For example, in an aspect, computing device 600, processor 605, memory 610, active panel microphone functionality component 1012, and/or determining component 625 may be configured to or may comprise means for determining, based on the ambient noise, whether there is an activity within a monitored area.

For example, the determining at block 710 may include the control panel 106 using the determining component 625 to recognize normal household voices and activity patterns based on ambient noise captured by the one or more built-in microphones 128 of the control panel 106. For example, the control panel 106 may execute one or more software, hardware, and/or firmware modules that implement AI algorithms to analyze the ambient noise captured by the one or more built-in microphones 128 of the control panel 106 and determine whether the ambient noise is indicative of normal household voices and activity patterns.

In an optional aspect, at block 712, the method 700 may further include sending a notification to a cloud system in response to detecting the activity within the monitored area. For example, in an aspect, computing device 600, processor 605, memory 610, active panel microphone functionality component 1012, and/or sending component 635 may be configured to or may comprise means for sending a notification to a cloud system in response to detecting the activity within the monitored area.

For example, the sending at block 712 may include the control panel 106 using the sending component 635, which may include or may be associated with a wired or wireless transmitter or transceiver, to send a notification to the cloud system 120 in response to detecting an activity within the premises 102. For example, the control panel 106 may be configured into a monitoring mode where the control panel 106 sends an alert to the cloud system 120 if the control panel 106 hears via the one or more built-in microphones 128 certain voices or activity patterns.

In an optional aspect, in response to determining that the ambient noise is indicative of the security event, the method 700 may further include initiating an alarm or sending a notification to a cloud system. For example, in an aspect, computing device 600, processor 605, memory 610, active panel microphone functionality component 1012, and/or determining component 625 may be configured to or may comprise means for initiating an alarm or sending a notification to a cloud system. For example, in an aspect, in response to determining that the ambient noise captured by the one or more built-in microphones 128 of the control panel 106 is indicative of a security event, the control panel 106 initiates an alarm or sends a notification to the cloud system 120.

In an optional aspect, determining whether the ambient noise is indicative of the security event comprises determining whether the ambient noise includes one or more known or unknown voices. For example, in an aspect, the control panel 106 may operate the determining component 625 to determine whether the ambient noise captured by the one or more built-in microphones 128 includes (a) any voices in the protected area (e.g., the premises 102) at a time when there typically is none, such as the middle of the night; (b) unknown voices in the protected area at a time when there typically is none, such as the middle of the night; (c) any unknown voices regardless of the time of day or activity period. For instance, the determining component 625 may compare the ambient noise to voice information, in general, or to known voices, in particular, to determine if the ambient noise includes any voices and/or if the ambient noise includes a known or unknown voice.

In an optional aspect, determining whether the ambient noise is indicative of the security event comprises determining whether the ambient noise is continually above a threshold level for longer than a time period. For example, in an aspect, the control panel 106 may operate the determining component 625 to determine whether the ambient noise captured by the one or more built-in microphones 128 of the control panel 106 is continually above a threshold level for longer than a time period, such as by comparing the noise level to the threshold level.

In an optional aspect, determining whether the ambient noise is indicative of the security event comprises determining whether the ambient noise includes a sequence of short sharp impacts. For example, in an aspect, the control panel 106 may operate the determining component 625 to determine whether the ambient noise captured by the one or more built-in microphones 128 of the control panel 106 includes noises associated with multiple short sharp impacts (e.g., an intruder trying to kick down a door). For instance, the determining component 625 may compare the ambient noise to known sounds of a sharp impact to determine if there is a match.

In an optional aspect, the security event comprises a fire event, and determining whether the ambient noise is indicative of the fire event comprises determining whether the ambient noise includes a standardized pattern of beeps associated with activation of a fire detection device in response to the fire event. For example, in an aspect, the control panel 106 may operate the determining component 625 to determine whether the ambient noise captured by the one or more built-in microphones 128 of the control panel 106 includes voices or sounds indicative of a fire event at the premises 102. For instance, the determining component 625 may compare the ambient noise to known sounds of a fire event, such as but not limited to sound associated with items burning, fire, smoke, or carbon monoxide alarm sounds, etc., to determine if there is a match.

In an optional aspect, the security event comprises a fire event, and determining whether the ambient noise is indicative of the fire event comprises determining whether the ambient noise includes at least one of a temporal-three pattern associated with a smoke detector going off or a temporal-four pattern associated with a carbon monoxide detector going off. For example, in an aspect, the control panel 106 may determine whether the ambient noise captured by the one or more built-in microphones 128 of the control panel 106 includes sounds generated by fire detection devices, such as a particular standardized pattern of beeps such as the temporal-three pattern of a smoke detector going off (according to ISO 8201 and ANSI/ASA S3.41 Temporal Pattern), the temporal-four pattern of a carbon monoxide detector going off, etc. In one non-limiting aspect, the control panel 106 may also voice annunciate fire or CO based on detecting these patterns.

In an optional aspect, determining whether the ambient noise is indicative of the security event comprises performing occupancy detection based on the ambient noise. For example, in an aspect, the control panel 106 may perform occupancy detection (e.g., for senior care at the premises 102) by analyzing the ambient noise captured by the one or more built-in microphones 128 of the control panel 106 to determine activity of a person, such as senior (e.g., whether the senior got out of bed, operated a kitchen appliance, watched TV, etc.). The control panel 106 may report such activity of the person (e.g., senior) to a remote user (e.g., to a relative of the senior) via an app 112 on a smartphone (e.g., the user device 114) of the user. In one non-limiting aspect, for example, voice commands can be given to the control panel 106 to activate emergency services.

In an optional aspect, determining whether the ambient noise is indicative of the security event comprises executing an artificial intelligence module locally at the control panel. For example, in an aspect, in order to determine whether the ambient noise captured by the one or more built-in microphones 128 of the control panel 106 is indicative of a security event, the control panel 106 may use built-in processing resources of the control panel 106 to implement AI algorithms configured for analyzing various discrete events and for determining what to do in response. Accordingly, an event may be a triggering point for taking certain actions.

In an optional aspect, the artificial intelligence module is downloaded to the control panel from a server, and the artificial intelligence module is customized for the control panel. In an aspect, for example, the AI algorithms may be downloaded to the control panel 106 from a server and may be customized for each individual panel.

In an optional aspect, the artificial intelligence module is configured to determine an action in response to a single detected event or in response to multiple concurrently-detected discrete events. For example, in an aspect, AI algorithms used in the control panel 106 for analyzing various discrete events may further be configured to determine what to do in response to a single detected event or in response to multiple detected events.

In an optional aspect, the artificial intelligence module is configured to integrate multiple concurrently-detected discrete events to infer that an integrated event is happening. In an aspect, for example, the control panel 106 may allow for integration of multiple events. For example, the control panel 106 may detect multiple unrelated events, and then correlate/infer an integrated event from the multiple unrelated events using built-in AI algorithms of the control panel 106.

In an optional aspect, the multiple concurrently-detected discrete events include at least two events detected using at least two different sensor types. For example, in an aspect, a Bluetooth radio (e.g., second other radios 134 in FIG. 1) of the control panel 106 may detect multiple unrecognized devices/smartphones within range at the premises 102, and the control panel 106 may also detect an unrecognized person by AI algorithms running locally at the control panel 106 on imagery captured by one or more built-in cameras 126 of the control panel 106. The control panel 106 may then infer that a gathering is happening at the premises 102.

In an optional aspect, the multiple concurrently-detected discrete events include at least one event detected based on the ambient noise using the one or more microphones. For example, in an aspect, the one or more built-in microphones 128 of the control panel 106 may continuously listen and may sample the ambient noise at the premises 102 at regular intervals to detect audio events, and at the same time the control panel 106 may receive reports of other events via various built-in radios (e.g., second other radios 134 in FIG. 1) such as a Bluetooth radio. In this aspect, the control panel 106 has intelligence to correlate multiple concurrently happening events based on an AI model implemented by an AI module at the control panel 106.

In an optional aspect, the multiple concurrently-detected discrete events include at least one event detected based on a wired or wireless signal received by the control panel from a sensor. For example, in an aspect, the control panel 106 may detect multiple front door open/close events reported by a door contact switch at an entrance of the premises 102, while a Bluetooth radio (e.g., second other radios 134 in FIG. 1) of the control panel 106 may also detect multiple unrecognized devices/smartphones within range at the premises 102, and/or the control panel 106 may detect an unrecognized person by AI algorithms running locally at the control panel 106 on imagery captured by one or more built-in cameras 126 of the control panel 106 and/or by external cameras. The control panel 106 may then infer that a gathering is happening at the premises 102.

In an optional aspect, the artificial intelligence module is configured to integrate multiple concurrently-detected discrete events based on one or more user preferences received via the control panel. In an aspect, for example, the AI model used in the artificial intelligence module of the control panel 106 to integrate multiple concurrently-detected discrete events may change depending on how a user intends to correlate various concurrently-happening events, for example, based on a certain anomaly or a use case desired by the user. For example, the AI model may be configured to take no action when a glass break event is detected while no other event is concurrently detected, but generate an alarm when a glass break event is detected concurrently with another event. In an aspect, the AI modeling and anomaly detection may be dynamically implemented and changed.

Some further example aspects are provided below.

1. A method comprising:
   monitoring, by a control panel, an ambient noise via one or more microphones in the control panel; and
   determining, by the control panel, whether the ambient noise is indicative of a security event.
2. The method of clause 1, further comprising, in response to determining that the ambient noise is indicative of the security event, initiating an alarm or sending a notification to a cloud system.
3. The method of any of the above clauses, further comprising, in response to determining that the ambient noise is indicative of the security event:
   capturing one or more still images or videos via a camera of the control panel; and
   sending the one or more still images or videos to a cloud system, wherein the cloud system is configured to send the one or more still images or videos to a device of a user for viewing on an app running on the device of the user.
4. The method of any of the above clauses, wherein determining whether the ambient noise is indicative of the security event comprises determining whether the ambient noise includes one or more known or unknown voices.
5. The method of any of the above clauses, wherein determining whether the ambient noise is indicative of the security event comprises determining whether the ambient noise is continually above a threshold level for longer than a time period.
6. The method of any of the above clauses, wherein determining whether the ambient noise is indicative of the security event comprises determining whether the ambient noise includes a sequence of short sharp impacts.
7. The method of any of the above clauses, wherein the security event comprises a fire event, wherein determining whether the ambient noise is indicative of the fire event comprises determining whether the ambient noise includes a standardized pattern of beeps associated with activation of a fire detection device in response to the fire event.
8. The method of any of the above clauses, wherein the security event comprises a fire event, wherein determining whether the ambient noise is indicative of the fire event comprises determining whether the ambient noise includes at least one of a temporal-three pattern associated with a smoke detector going off or a temporal-four pattern associated with a carbon monoxide detector going off.

9. The method of any of the above clauses, wherein determining whether the ambient noise is indicative of the security event comprises performing occupancy detection based on the ambient noise.

10. The method of any of the above clauses, wherein determining whether the ambient noise is indicative of the security event comprises:
determining, based on the ambient noise, whether there is an activity within a monitored area; and
sending a notification to a cloud system in response to detecting the activity within the monitored area.

11. The method of any of the above clauses, wherein determining whether the ambient noise is indicative of the security event comprises executing an artificial intelligence module locally at the control panel.

12. The method of any of the above clauses, wherein the artificial intelligence module is downloaded to the control panel from a server, wherein the artificial intelligence module is customized for the control panel.

13. The method of any of the above clauses, wherein the artificial intelligence module is configured to determine an action in response to a single detected event or in response to multiple concurrently-detected discrete events.

14. The method of any of the above clauses, wherein the artificial intelligence module is configured to integrate multiple concurrently-detected discrete events to infer that an integrated event is happening.

15. The method of any of the above clauses, wherein the multiple concurrently-detected discrete events include at least two events detected using at least two different sensor types.

16. The method of any of the above clauses, wherein the multiple concurrently-detected discrete events include at least one event detected based on the ambient noise using the one or more microphones.

17. The method of any of the above clauses, wherein the multiple concurrently-detected discrete events include at least one event detected based on a wired or wireless signal received by the control panel from a sensor.

18. The method of any of the above clauses, wherein the artificial intelligence module is configured to integrate multiple concurrently-detected discrete events based on one or more user preferences received via the control panel.

An apparatus comprising:
a memory; and
a processor communicatively coupled with the memory and configured to perform the method of any of the above clauses.

A non-transitory computer-readable medium storing instructions executable by a processor that, when executed, cause the processor to perform the method of any of the above clauses.

An apparatus comprising means for performing the method of any of the above clauses.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
monitoring, by a control panel, an ambient noise via one or more microphones in the control panel;
determining, by the control panel, whether the ambient noise is indicative of a security event, comprising performing occupancy detection based on the ambient noise;
determining, by the control panel using a short range communication radio in the control panel, and responsive to the control panel having detected occupancy based on the ambient noise, whether one or more unrecognized short range communication devices are within range of the control panel; and
capturing, by the control panel, one or more still images or videos via a camera of the control panel, in response to the control panel having detected occupancy based on the ambient noise and the control panel having determined that the one or more unrecognized short range communication devices are within range of the control panel.

2. The method of claim 1, further comprising, in response to determining that the ambient noise is indicative of the security event, initiating an alarm or sending a notification to a cloud system.

3. The method of claim 1, further comprising sending the one or more still images or videos to a cloud system, wherein the cloud system is configured to send the one or more still images or videos to a device of a user for viewing on an app running on the device of the user.

4. The method of claim 1, wherein determining whether the ambient noise is indicative of the security event comprises determining whether the ambient noise includes one or more known or unknown voices and/or whether the ambient noise is continually above a threshold level for longer than a time period.

5. The method of claim 1, wherein determining whether the ambient noise is indicative of the security event comprises determining whether the ambient noise includes a sequence of short sharp impacts.

6. The method of claim 1, further comprising determining whether the ambient noise is indicative of a fire event by determining whether the ambient noise includes a standardized pattern of beeps associated with activation of a fire detection device in response to the fire event.

7. The method of claim 1, further comprising determining whether the ambient noise is indicative of a fire event by determining whether the ambient noise includes at least one of a temporal-three pattern associated with a smoke detector going off or a temporal-four pattern associated with a carbon monoxide detector going off.

8. The method of claim 1, wherein determining whether the ambient noise is indicative of the security event comprises:
   determining, based on the ambient noise, whether there is an activity within a monitored area; and
   sending a notification to a cloud system in response to detecting the activity within the monitored area.

9. The method of claim 1, wherein determining whether the ambient noise is indicative of the security event comprises executing an artificial intelligence module locally at the control panel.

10. The method of claim 9, wherein the artificial intelligence module is downloaded to the control panel from a server, wherein the artificial intelligence module is customized for the control panel.

11. The method of claim 9, wherein the artificial intelligence module is configured to determine an action in response to a single detected event or in response to multiple concurrently-detected discrete events.

12. The method of claim 9, wherein the artificial intelligence module is configured to integrate multiple concurrently-detected discrete events to infer that an integrated event is happening.

13. The method of claim 12, wherein the multiple concurrently-detected discrete events include at least two events detected using at least two different sensor types.

14. The method of claim 12, wherein the multiple concurrently-detected discrete events include at least one event detected based on the ambient noise using the one or more microphones.

15. The method of claim 12, wherein the multiple concurrently-detected discrete events include at least one event detected based on a wired or wireless signal received by the control panel from a sensor.

16. The method of claim 9, wherein the artificial intelligence module is configured to integrate multiple concurrently-detected discrete events based on one or more user preferences received via the control panel.

17. An apparatus comprising:
   a memory; and
   a processor communicatively coupled with the memory and configured to:
      monitor, by a control panel, an ambient noise via one or more microphones in the control panel;
      determine, by the control panel, whether the ambient noise is indicative of a security event, comprising performing occupancy detection based on the ambient noise;
   determining, by the control panel using a short range communication radio in the control panel, and responsive to the control panel having detected occupancy based on the ambient noise, whether one or more unrecognized short range communication devices are within range of the control panel; and
   capture, by the control panel, one or more still images or videos via a camera of the control panel, in response to the control panel having detected occupancy based on the ambient noise and the control panel having determined that the one or more unrecognized short range communication devices are within range of the control panel.

18. A non-transitory computer-readable medium storing instructions executable by a processor that, when executed, cause to the processor to:
   monitor, by a control panel, an ambient noise via one or more microphones in the control panel;
   determine, by the control panel, whether the ambient noise is indicative of a security event, comprising performing occupancy detection based on the ambient noise;
   determine, by the control panel using a short range communication radio in the control panel, and responsive to the control panel having detected occupancy based on the ambient noise, whether one or more unrecognized short range communication devices are within range of the control panel; and
   capture, by the control panel, one or more still images or videos via a camera of the control panel, in response to the control panel having detected occupancy based on the ambient noise and the control panel having determined that the one or more unrecognized short range communication devices are within range of the control panel.

19. The method of claim 1, further comprising executing an artificial intelligence algorithm configured to scan the one or more still images or videos for visual verification of the security event.

* * * * *